US012795563B2

(12) United States Patent
Ma et al.

(10) Patent No.: US 12,795,563 B2
(45) Date of Patent: Nov. 10, 2026

(54) DELAY-BASED CELL SELECTION OR CELL RESELECTION FOR COMMUNICATION NETWORKS

(71) Applicant: QUALCOMM Incorporated, San Diego, CA (US)

(72) Inventors: Liangping Ma, San Diego, CA (US); Xiao Feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 476 days.

(21) Appl. No.: 17/575,576

(22) Filed: Jan. 13, 2022

(65) Prior Publication Data

US 2022/0232491 A1 Jul. 21, 2022

Related U.S. Application Data

(60) Provisional application No. 63/138,373, filed on Jan. 15, 2021.

(51) Int. Cl.
*H04W 56/00* (2009.01)
*G01S 19/25* (2010.01)
(Continued)

(52) U.S. Cl.
CPC ......... *H04W 56/001* (2013.01); *G01S 19/258* (2013.01); *H04W 56/006* (2013.01); *H04W 36/085* (2023.05); *H04W 84/06* (2013.01)

(58) Field of Classification Search
CPC . H04W 56/001; H04W 36/08; H04W 56/006; H04W 84/06; H04W 48/20; H04W 36/085; G01S 19/258; H04B 7/18513
See application file for complete search history.

(56) References Cited

U.S. PATENT DOCUMENTS 8,842,571 B1 9/2014 Yu et al.
11,153,838 B1 * 10/2021 Thota ................ H04W 56/0015
(Continued)

FOREIGN PATENT DOCUMENTS

WO WO-2020031120 A2 2/2020
WO WO-2020067756 A1 4/2020
(Continued)

OTHER PUBLICATIONS

3GPP TR 38.821: “3rd Generation Partnership Project, Technical Specification Group Radio Access Network, Solutions for NR to Support Non-Terrestrial Networks (NTN) (Release16)”, 3GPP Standard, Technical Report, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), XP051860814, pp. 1-140, Retrieved from the Internet: URL: http://ftp.3gpp.org/Specs/archive/38_series/38.821/38821-g00.zip 38821-g00.doc [Retrieved on Jan. 16, 2020] Paragraphs [04.1], [6.3.4], [07.3], [09.2], Para. 7.3. 1.1-7.3. 1.2, 7.3.1.3.2, Para.8.1-8.2.2.2, p. 63, Paragraph 6.2.4 p. 82, Paragraph 7.2.1.2.1-p. 83, Paragraph 7.2.1.2.1, p. 89, Paragraph 7.3-p. 93, Paragraph 7.3.1.7, Section 1, Section 5, Section: 7.2.1.1, p. 38, Option 2, Section 6.2.3, Section 6.2.4, abstract sections 7.3.1 and 7.3.2.
(Continued)

*Primary Examiner* — Mandish K Randhawa
(74) *Attorney, Agent, or Firm* — HOLLAND & HART LLP

(57) ABSTRACT

Methods, systems, and devices for wireless communication at a user equipment (UE) are described. A UE may receive a first timing information associated with a first cell and a second timing information associated with a second cell. In some examples, the first cell may be associated with a first non-terrestrial device and the second cell may be associated
(Continued)

with a second non-terrestrial device. In some examples, the first cell and the second cell may be associated with a common non-terrestrial device. The UE may calculate a propagation delay in accordance with a type of delay measurement and select a cell based on the propagation delay. The UE may calculate a propagation delay in accordance with a type of delay measurement and reselect a cell based on the propagation delay. In some examples, the propagation delay may be based on the first timing information and the second timing information.

25 Claims, 15 Drawing Sheets

(51) Int. Cl.

| | |
|---|---|
| *H04W 36/08* | (2009.01) |
| *H04W 84/06* | (2009.01) |

(56) References Cited

U.S. PATENT DOCUMENTS

| | | | | |
|---|---|---|---|---|
| 2012/0147796 | A1* | 6/2012 | Ishii | H04W 56/0065 370/281 |
| 2016/0227505 | A1* | 8/2016 | Loehr | H04L 69/323 |
| 2019/0159149 | A1* | 5/2019 | Ryu | H04W 56/0045 |
| 2020/0092777 | A1* | 3/2020 | Agiwal | H04W 80/02 |
| 2021/0321464 | A1* | 10/2021 | Lin | H04B 7/1851 |
| 2021/0376915 | A1* | 12/2021 | Mahalingam | H04W 72/542 |

FOREIGN PATENT DOCUMENTS

| | | | |
|---|---|---|---|
| WO | WO-2020092566 | A1 | 5/2020 |
| WO | WO-2020165675 | A1 | 8/2020 |

OTHER PUBLICATIONS

Asia Pacific Telecom: "Discussion on Reference Timing Delivery for NTN", 3GPP Draft, 3GPP TSG RAN WG1#102-e, R1-2006643, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 8, 2020 (Aug. 8, 2020), 4 Pages, XP051918166, Retrieved from the Internet: URL: https://ftp.3gpp.org/tsg_ran/WG1_RL1/TSGR1_102-e/Docs/R1-2006643.zip R1-2006643 Discussion on Reference Timing Delivery for NTN.docx [retrieved on Aug. 8, 2020] paragraph 2 Sections 1-2.

Interdigital Inc. (Email Discussion Rapporteur): "Report of Email Discussion [106#73][NR/NTN] Mobility Issues and Solutions", 3GPP Draft, 3GPP RAN WG2 Meeting #107, R2-1910961 Summary of Email Discussion [106_73] [NRNTN] Mobility Issues and Solutions (R16 NTN SI AI 11.6.4.1), 3rd Generation Partnership Project (3GPP), Mobile Competence Centre, 650, Ro, vol. RAN WG2, No. Prague, Czech Republic, Aug. 26, 2019-Aug. 30, 2019 Aug. 22, 2019 (Aug. 22, 2019), 50 Pages, XP051761910, Retrieved from the Internet: URL: http://www.3gpp.org/ftp/tsg_ran/WG2_RL2/TSGR2_107/Docs/R2-1910961.zip [retrieved on Aug. 22, 2019] paragraph 3.7 figure 2.

International Search Report and Written Opinion—PCT/US2022/012508—ISA/EPO—Apr. 21, 2022.

Asia Pacific Telecom: "Discussion on Delay Difference on Measurements for NTN", 3GPP TSG RAN WG2#111-e, R2-2007955, 3rd Generation Partnership Project, Mobile Competence Centre, 650, Route Des Lucioles, F-06921 Sophia-Antipolis Cedex, France, vol. RAN WG2, No. e-Meeting, Aug. 17, 2020-Aug. 28, 2020, Aug. 7, 2020, XP051912576, 4 Pages, The Whole Document.

* cited by examiner

DELAY-BASED CELL SELECTION OR CELL RESELECTION FOR COMMUNICATION NETWORKS

CROSS REFERENCE

The present application for patent claims the benefit of U.S. Provisional Patent Application No. 63/138,373 by MA et al., entitled "DELAY-BASED CELL SELECTION OR CELL RESELECTION FOR COMMUNICATION NETWORKS," filed Jan. 15, 2021, assigned to the assignee hereof, and expressly incorporated by reference herein.

INTRODUCTION

The following relates to wireless communications, and more specifically cell management for communication networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communications devices, which may be otherwise known as user equipment (UE).

SUMMARY

A method for wireless communication at a UE is described. The method may include receiving a first timing information associated with a first cell and a second timing information associated with a second cell. The method may further include reselecting a cell based on a propagation delay calculated based on the first timing information and the second timing information.

An apparatus for wireless communication at a UE is described. The apparatus may include a processor and memory coupled with the processor, the processor configured to receive a first timing information associated with a first cell and a second timing information associated with a second cell. The processor is further configured to reselect a cell based on a propagation delay calculated based on the first timing information and the second timing information.

Another apparatus for wireless communication at a UE is described. The apparatus may include means for receiving a first timing information associated with a first cell and a second timing information associated with a second cell. The apparatus may further include means for reselecting a cell based on a propagation delay calculated based on the first timing information and the second timing information.

A non-transitory computer-readable medium storing code for wireless communication at a UE is described. The code may include instructions executable by a processor to receive a first timing information associated with a first cell and a second timing information associated with a second cell. The instructions may further be executable by a processor to reselect a cell based on a propagation delay calculated based on the first timing information and the second timing information.

Some examples of the method, apparatuses, and non-transitory computer-readable medium described herein may further include operations, features, means, or instructions for calculating the propagation delay based on satellite ephemeris information and a location of the UE. Some examples of the method, apparatuses, and non-transitory computer-readable medium described herein may further include operations, features, means, or instructions for calculating the propagation delay based on a type of delay measurement.

Some examples of the method, apparatuses, and non-transitory computer-readable medium described herein may further include operations, features, means, or instructions for receiving, from a base station, a control signaling indicating the type of delay measurement. Some examples of the method, apparatuses, and non-transitory computer-readable medium described herein may further include operations, features, means, or instructions for receiving, from a base station, a configuration indicating a set of multiple cells to be measured by the UE.

Some examples of the method, apparatuses, and non-transitory computer-readable medium described herein may further include operations, features, means, or instructions for determining that the first cell and the second cell are included in the set of multiple cells based on the configuration. Some examples of the method, apparatuses, and non-transitory computer-readable medium described herein may further include operations, features, means, or instructions for calculating the propagation delay based on the first cell and the second cell being included in the set of multiple cells.

Some examples of the method, apparatuses, and non-transitory computer-readable medium described herein may further include operations, features, means, or instructions for receiving a first frame from the first cell and a second frame from the second cell and determining a first time of arrival associated with the first frame and a second time of arrival associated with the second frame. In some examples, the first frame and the second frame may be associated with a common time instant. Some examples of the method, apparatuses, and non-transitory computer-readable medium described herein may further include operations, features, means, or instructions for calculating the propagation delay based on the first time of arrival associated with the first frame and the second time of arrival associated with the second frame.

Some examples of the method, apparatuses, and non-transitory computer-readable medium described herein may further include operations, features, means, or instructions for selecting the first cell based on the first time of arrival being earlier than the second time of arrival. Some examples of the method, apparatuses, and non-transitory computer-readable medium described herein may further include operations, features, means, or instructions for selecting the second cell based on the second time of arrival being earlier than the first time of arrival. Some examples of the method, apparatuses, and non-transitory computer-readable medium described herein, the first frame and the second frame may be associated with a common system frame number.

Some examples of the method, apparatuses, and non-transitory computer-readable medium described herein may further include operations, features, means, or instructions for receiving a first message from the first cell and a second message from the second cell, where the first message may be associated with a first timestamp and the second message may be associated with a second timestamp, and determining a first time of arrival associated with the first message and a second time of arrival associated with the second message. Some examples of the method, apparatuses, and non-transitory computer-readable medium described herein may further include operations, features, means, or instructions for calculating the propagation delay based on a first time difference between the first timestamp and the first time of arrival and a second time difference between the second timestamp and the second time of arrival.

Some examples of the method, apparatuses, and non-transitory computer-readable medium described herein may further include operations, features, means, or instructions for selecting the first cell based on the first time difference being less than the second time difference. Some examples of the method, apparatuses, and non-transitory computer-readable medium described herein may further include operations, features, means, or instructions for selecting the second cell based on the second time difference being less than the first time difference.

Some examples of the method, apparatuses, and non-transitory computer-readable medium described herein may further include operations, features, means, or instructions for receiving a first time indication from the first cell and a second time indication from the second cell and determining a first time of arrival associated with the first time indication and a second time of arrival associated with the second time indication. In some examples, the first time indication and the second time indication may be associated with a common time source. Some examples of the method, apparatuses, and non-transitory computer-readable medium described herein may further include operations, features, means, or instructions for calculating the propagation delay based on a first time difference between the first time indication and the first time of arrival and a second time difference between the second time indication and the second time of arrival.

Some examples of the method, apparatuses, and non-transitory computer-readable medium described herein may further include operations, features, means, or instructions for selecting the first cell based on the first time difference being less than the second time difference. Some examples of the method, apparatuses, and non-transitory computer-readable medium described herein may further include operations, features, means, or instructions for selecting the second cell based on the second time difference being less than the first time difference.

In some examples of the method, apparatuses, and non-transitory computer-readable medium described herein, the first time indication or the second time indication or both may be included in at least one of a system information block, a radio resource control signal, a medium access control (MAC) control element, or a combination thereof.

Some examples of the method, apparatuses, and non-transitory computer-readable medium described herein may further include operations, features, means, or instructions for receiving a first time indication associated with a first synchronization signal block and a second time indication associated with a second synchronization signal block, determining a first time of arrival associated with the first time indication and a second time of arrival associated with the second time indication, and calculating the propagation delay based on a first time difference between the first time indication and the first time of arrival and a second time difference between the second time indication and the second time of arrival.

Some examples of the method, apparatuses, and non-transitory computer-readable medium described herein may further include operations, features, means, or instructions for selecting a beam based on the calculated propagation delay. Some examples of the method, apparatuses, and non-transitory computer-readable medium described herein, the first time indication and the second time indication each include a time variance relative to a common time source.

In some examples of the method, apparatuses, and non-transitory computer-readable medium described herein, the first synchronization signal block and the second synchronization signal block may be associated with a same cell. Some examples of the method, apparatuses, and non-transitory computer-readable medium described herein, the first synchronization signal block and the second synchronization signal block may be associated with different cells.

Some examples of the method, apparatuses, and non-transitory computer-readable medium described herein may further include operations, features, means, or instructions for reselecting the cell. Some examples of the method, apparatuses, and non-transitory computer-readable medium described herein may further include operations, features, means, or instructions for transmitting a random access preamble to the reselected cell.

Some examples of the method, apparatuses, and non-transitory computer-readable medium described herein may further include operations, features, means, or instructions for transmitting an uplink shared channel after the random access preamble. Some examples of the method, apparatuses, and non-transitory computer-readable medium described herein may further include operations, features, means, or instructions for calculating the propagation delay based on an absolute time-based delay measurement or a relative time-based delay measurement or both.

In some examples of the method, apparatuses, and non-transitory computer-readable medium described herein, the first cell may be associated with a first non-terrestrial device and the second cell may be associated with a second non-terrestrial device. In some examples of the method, apparatuses, and non-transitory computer-readable medium described herein, the first cell and the second cell may be associated with a common non-terrestrial device.

A method for wireless communication at a UE is described. The method may include receiving a first timing information associated with a first cell and a second timing information associated with a second cell. The method may further include selecting a cell based on a propagation delay calculated based on the first timing information and the second timing information.

An apparatus for wireless communication at a UE is described. The apparatus may include a processor and memory coupled with the processor, the processor configured to receive a first timing information associated with a first cell and a second timing information associated with a second cell. The processor is further configured to select a cell based on a propagation delay calculated based on the first timing information and the second timing information.

Another apparatus for wireless communication at a UE is described. The apparatus may include means for receiving a first timing information associated with a first cell and a second timing information associated with a second cell. The apparatus may further include means for selecting a cell based on a propagation delay calculated based on the first timing information and the second timing information.

A non-transitory computer-readable medium storing code for wireless communication at a UE is described. The code may include instructions executable by a processor to receive a first timing information associated with a first cell and a second timing information associated with a second cell. The instructions may further be executable by a processor to select a cell based on a propagation delay calculated based on the first timing information and the second timing information.

Some examples of the method, apparatuses, and non-transitory computer-readable medium described herein may further include operations, features, means, or instructions for calculating the propagation delay based on satellite ephemeris information and a location of the UE. Some examples of the method, apparatuses, and non-transitory computer-readable medium described herein may further include operations, features, means, or instructions for calculating the propagation delay based on a type of delay measurement.

Some examples of the method, apparatuses, and non-transitory computer-readable medium described herein may further include operations, features, means, or instructions for receiving, from a base station, a control signaling indicating the type of delay measurement. Some examples of the method, apparatuses, and non-transitory computer-readable medium described herein may further include operations, features, means, or instructions for receiving, from a base station, a configuration. The configuration may indicate a set of multiple cells to be measured by the UE.

Some examples of the method, apparatuses, and non-transitory computer-readable medium described herein may further include operations, features, means, or instructions for determining that the first cell and the second cell may be included in the set of multiple cells based on the configuration. In some examples, the method, apparatuses, and non-transitory computer-readable medium described herein may further include operations, features, means, or instructions for calculating the propagation delay based on the first cell and the second cell being included in the set of multiple cells.

Some examples of the method, apparatuses, and non-transitory computer-readable medium described herein may further include operations, features, means, or instructions for receiving a first frame from the first cell and a second frame from the second cell and determining a first time of arrival associated with the first frame and a second time of arrival associated with the second frame. In some examples, the first frame and the second frame may be associated with a common time instant. In some examples, the method, apparatuses, and non-transitory computer-readable medium described herein may further include operations, features, means, or instructions for calculating the propagation delay based on the first time of arrival associated with the first frame and the second time of arrival associated with the second frame.

Some examples of the method, apparatuses, and non-transitory computer-readable medium described herein may further include operations, features, means, or instructions for selecting the first cell based on the first time of arrival being earlier than the second time of arrival and selecting the second cell based on the second time of arrival being earlier than the first time of arrival. Some examples of the method, apparatuses, and non-transitory computer-readable medium described herein, the first frame and the second frame may be associated with a common system frame number.

Some examples of the method, apparatuses, and non-transitory computer-readable medium described herein may further include operations, features, means, or instructions for receiving a first message from the first cell and a second message from the second cell and determining a first time of arrival associated with the first message and a second time of arrival associated with the second message. In some examples, the first message may be associated with a first timestamp and the second message may be associated with a second timestamp. In some examples, the method, apparatuses, and non-transitory computer-readable medium described herein may further include operations, features, means, or instructions for calculating the propagation delay based on a first time difference between the first timestamp and the first time of arrival and a second time difference between the second timestamp and the second time of arrival.

Some examples of the method, apparatuses, and non-transitory computer-readable medium described herein may further include operations, features, means, or instructions for selecting the first cell based on the first time difference being less than the second time difference and selecting the second cell based on the second time difference being less than the first time difference.

Some examples of the method, apparatuses, and non-transitory computer-readable medium described herein may further include operations, features, means, or instructions for receiving a first time indication from the first cell and a second time indication from the second cell, where the first time indication and the second time indication may be associated with a common time source, determining a first time of arrival associated with the first time indication and a second time of arrival associated with the second time indication, and calculating the propagation delay based on a first time difference between the first time indication and the first time of arrival and a second time difference between the second time indication and the second time of arrival.

Some examples of the method, apparatuses, and non-transitory computer-readable medium described herein may further include operations, features, means, or instructions for selecting the first cell based on the first time difference being less than the second time difference and selecting the second cell based on the second time difference being less than the first time difference. In some examples of the method, apparatuses, and non-transitory computer-readable medium described herein, the first time indication or the second time indication or both may be included in at least one of a system information block, a radio resource control signal, a MAC control element, or a combination thereof.

Some examples of the method, apparatuses, and non-transitory computer-readable medium described herein may further include operations, features, means, or instructions for receiving a first time indication associated with a first synchronization signal block and a second time indication associated with a second synchronization signal block, determining a first time of arrival associated with the first time indication and a second time of arrival associated with the second time indication, and calculating the propagation delay based on a first time difference between the first time indication and the first time of arrival and a second time difference between the second time indication and the second time of arrival.

Some examples of the method, apparatuses, and non-transitory computer-readable medium described herein may further include operations, features, means, or instructions for selecting a beam based on the calculated propagation delay. In some examples of the method, apparatuses, and non-transitory computer-readable medium described herein, the first time indication and the second time indication each include a time variance relative to a common time source.

In some examples of the method, apparatuses, and non-transitory computer-readable medium described herein, the first synchronization signal block and the second synchronization signal block may be associated with a same cell. In some examples of the method, apparatuses, and non-transitory computer-readable medium described herein, the first synchronization signal block and the second synchronization signal block may be associated with different cells.

Some examples of the method, apparatuses, and non-transitory computer-readable medium described herein may further include operations, features, means, or instructions for transmitting a random access preamble to the selected cell. Some examples of the method, apparatuses, and non-transitory computer-readable medium described herein may further include operations, features, means, or instructions for transmitting an uplink shared channel after the random access preamble.

Some examples of the method, apparatuses, and non-transitory computer-readable medium described herein may further include operations, features, means, or instructions for calculating the propagation delay based on an absolute time-based delay measurement or a relative time-based delay measurement or both. In some examples of the method, apparatuses, and non-transitory computer-readable medium described herein, the first cell may be associated with a first non-terrestrial device and the second cell may be associated with a second non-terrestrial device. In some examples of the method, apparatuses, and non-transitory computer-readable medium described herein, the first cell and the second cell may be associated with a common non-terrestrial device.

A method for wireless communication at a user equipment (UE) is described. The method may include a UE receiving a first timing information associated with a first cell and a second timing information associated with a second cell. The UE may then select or reselect a cell based on a propagation delay calculated in accordance with a type of delay measurement. In some examples, the propagation delay may be based on the first timing information and the second timing information.

An apparatus for wireless communication at a UE is described. The apparatus may include a processor and memory coupled with the processor. The processor may be configured to receive a first timing information associated with a first cell and a second timing information associated with a second cell. The processor may further be configured to select or reselect a cell based on a propagation delay calculated in accordance with a type of delay measurement. In some examples, the propagation delay may be based on the first timing information and the second timing information.

Another apparatus for wireless communication at a UE is described. The apparatus may include means for receiving a first timing information associated with a first cell and a second timing information associated with a second cell. The apparatus may further include means for selecting or reselecting a cell based on a propagation delay calculated in accordance with a type of delay measurement. In some examples, the propagation delay may be based on the first timing information and the second timing information.

A non-transitory computer-readable medium storing code for wireless communication at a UE is described. The code may include instructions executable by a processor to receive a first timing information associated with a first cell and a second timing information associated with a second cell. The code may further include instructions executable by a processor to select or reselect a cell based on a propagation delay calculated in accordance with a type of delay measurement. In some examples, the propagation delay may be based on the first timing information and the second timing information.

Some examples of the method, apparatuses, and non-transitory computer-readable medium described herein may further include operations, features, means, or instructions for receiving, from a base station, a control signaling indicating the type of delay measurement.

Some examples of the method, apparatuses, and non-transitory computer-readable medium described herein may further include operations, features, means, or instructions for receiving, from the base station, a configuration indicating a set of multiple cells to be measured by the UE.

Some examples of the method, apparatuses, and non-transitory computer-readable medium described herein may further include operations, features, means, or instructions for determining that the first cell and the second cell may be included in the set of multiple cells based on receiving the configuration and calculating the propagation delay based on determining that the first cell and the second cell may be included in the set of multiple cells.

Some examples of the method, apparatuses, and non-transitory computer-readable medium described herein may further include operations, features, means, or instructions for receiving a first frame from the first cell and a second frame from the second cell. In some examples, the first frame and the second frame may be associated with a common time instant. Some examples of the method, apparatuses, and non-transitory computer-readable medium described herein may further include operations, features, means, or instructions for determining a first time of arrival associated with the first frame and a second time of arrival associated with the second frame, and calculating the propagation delay based on the first time of arrival associated with the first frame and the second time of arrival associated with the second frame.

Some examples of the method, apparatuses, and non-transitory computer-readable medium described herein may further include operations, features, means, or instructions for selecting the first cell for based on determining that the first time of arrival may be earlier than the second time of arrival. Some examples of the method, apparatuses, and non-transitory computer-readable medium described herein may further include operations, features, means, or instructions for selecting the second cell based on determining that the second time of arrival may be earlier than the first time of arrival.

In some examples of the method, apparatuses, and non-transitory computer-readable medium described herein, the first frame and the second frame may be associated with a common system frame number. Some examples of the method, apparatuses, and non-transitory computer-readable medium described herein may further include operations, features, means, or instructions for receiving a first message from the first cell and a second message from the second cell. In some examples, the first message may be associated with a first timestamp and the second message may be associated with a second timestamp. Some examples of the method, apparatuses, and non-transitory computer-readable medium described herein may further include operations, features, means, or instructions for determining a first time of arrival associated with the first message and a second time of arrival associated with the second message, and calculating the propagation delay based on a first time difference between the first timestamp and the first time of arrival and a second time difference between the second timestamp and the second time of arrival.

Some examples of the method, apparatuses, and non-transitory computer-readable medium described herein may further include operations, features, means, or instructions for selecting the first cell based on determining that the first time difference may be less than the second time difference. Some examples of the method, apparatuses, and non-transitory computer-readable medium described herein may further include operations, features, means, or instructions for selecting the second cell based on determining that the second time difference may be less than the first time difference.

Some examples of the method, apparatuses, and non-transitory computer-readable medium described herein may further include operations, features, means, or instructions for receiving a first time indication from the first cell and a second time indication from the second cell. In some examples, the first time indication and the second time indication may be associated with a common time source. Some examples of the method, apparatuses, and non-transitory computer-readable medium described herein may further include operations, features, means, or instructions for determining a first time of arrival associated with the first time indication and a second time of arrival associated with the second time indication, and calculating the propagation delay based on a first time difference between the first time indication and the first time of arrival and a second time difference between the second time indication and the second time of arrival.

Some examples of the method, apparatuses, and non-transitory computer-readable medium described herein may further include operations, features, means, or instructions for selecting the first cell based on determining that the first time difference may be less than the second time difference and selecting the second cell based on determining that the second time difference may be less than the first time difference.

In some examples of the method, apparatuses, and non-transitory computer-readable medium described herein, the first time indication or the second time indication or both may be included in at least one of a system information block, a radio resource control signal, a MAC control element, or a combination thereof.

Some examples of the method, apparatuses, and non-transitory computer-readable medium described herein may further include operations, features, means, or instructions for receiving a first time indication associated with a first synchronization signal block and a second time indication associated with a second synchronization signal block. Some examples of the method, apparatuses, and non-transitory computer-readable medium described herein may further include operations, features, means, or instructions for determining a first time of arrival associated with the first time indication and a second time of arrival associated with the second time indication, and calculating the propagation delay based on a first time difference between the first time indication and the first time of arrival and a second time difference between the second time indication and the second time of arrival. Some examples of the method, apparatuses, and non-transitory computer-readable medium described herein may further include operations, features, means, or instructions for selecting a beam based on the calculated propagation delay.

In some examples of the method, apparatuses, and non-transitory computer-readable medium described herein, the first time indication and the second time indication each include a time variance relative to a common time source. In some examples of the method, apparatuses, and non-transitory computer-readable medium described herein, the first synchronization signal block and the second synchronization signal block may be associated with a same cell. In some examples of the method, apparatuses, and non-transitory computer-readable medium described herein, the first synchronization signal block and the second synchronization signal block may be associated with different cells.

Some examples of the method, apparatuses, and non-transitory computer-readable medium described herein may further include operations, features, means, or instructions for transmitting a random access preamble to the selected or reselected cell.

Some examples of the method, apparatuses, and non-transitory computer-readable medium described herein may further include operations, features, means, or instructions for transmitting an uplink shared channel after transmitting the random access preamble. In some examples of the method, apparatuses, and non-transitory computer-readable medium described herein, the type of delay measurement includes an absolute time-based delay measurement or a relative time-based delay measurement or both.

In some examples of the method, apparatuses, and non-transitory computer-readable medium described herein, the first cell may be associated with a first non-terrestrial device and the second cell may be associated with a second non-terrestrial device. In some examples of the method, apparatuses, and non-transitory computer-readable medium described herein, the first cell and the second cell may be associated with a common non-terrestrial device.

DETAILED DESCRIPTION

Figure 1:
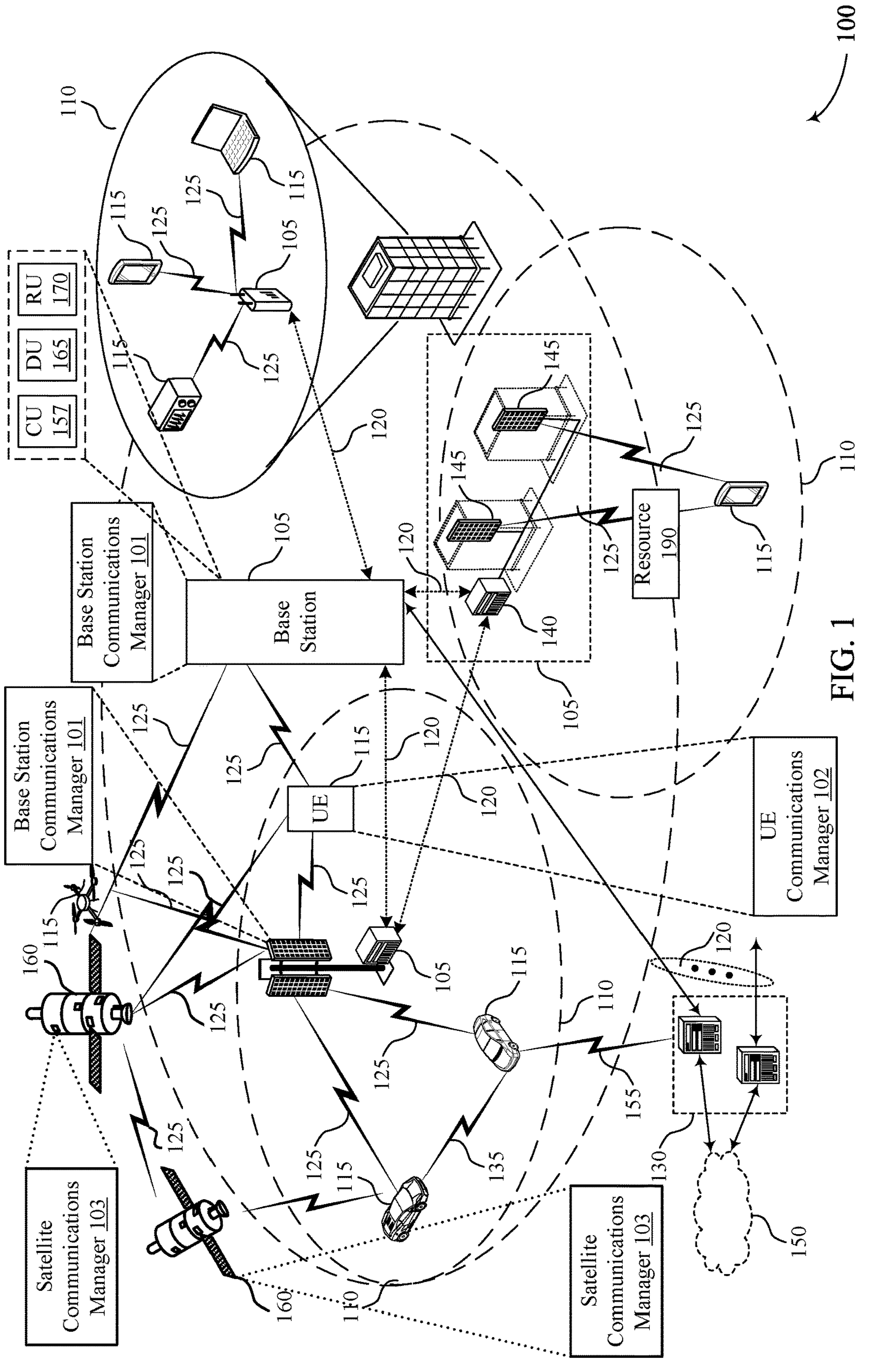
FIG. 1 illustrates an example of a wireless communications system that supports delay-based cell selection or cell reselection for communication networks in accordance with one or more aspects of the present disclosure.

A wireless communications system may support communication beams for communications between one or more communications devices. A communication beam may support a communication link between a transmitter and a receiver. For example, a communication beam may support uplink signaling, downlink signaling, connection procedures, etc. According to some examples, a transmitter (e.g., a base station, non-terrestrial devices, etc.) may be configured with multiple antennas, which may be used for transmissions. Similarly, a receiver (e.g., a UE) may be configured with multiple antennas, which may be used for transmissions. In non-terrestrial networks (e.g., wireless communications systems supporting non-terrestrial communications devices), a UE may establish an initial connection with a non-terrestrial communications device (e.g., a satellite). The non-terrestrial communications device may then communicate with the UE on an active communication beam, and the UE may communicate with the non-terrestrial communications device on an active UE communication beam. In non-terrestrial networks, a UE may frequently switch from one non-terrestrial communications device to another non-terrestrial communications device due to the relative high mobility between the UE and the non-terrestrial communications devices.

In some examples, a non-terrestrial communications device may be configured as a cell or multiple cells (e.g., each cell including a subset of the beams from a satellite). A cell may be a geographical area covered by the frequency emitted by a non-terrestrial communications device in a non-terrestrial network. Due to a large distance between UEs and non-terrestrial communications devices and frequent switching of the UE from one non-terrestrial communications device to another non-terrestrial communications device, the UE may be configured to update a selection of a cell for communications. In terrestrial networks, the UE may use reference signal received power to select a cell for communicating. For example, a UE may receive a reference signal from a base station and may calculate a value of the received signal power to determine a distance between the UE and the base station. However, in non-terrestrial networks, a distance between the UE and the non-terrestrial communications device may be large resulting in a small change in reference signal received power between two cells. In particular, the change in reference signal received power as a function of the distance of the UE from a beam center (e.g., center of a beam formed by a satellite) may be small. Accordingly, the UE may use other information (e.g., timing information) to select a cell in non-terrestrial networks.

One or more aspects of the present disclosure provide for wireless communications systems to perform cell selection procedure using timing information. In particular, one or more aspects of the present disclosure, the UE may receive timing information from at least two non-terrestrial communications devices configured as different cells. The UE may then select or reselect a cell based on a time difference (e.g., delay) between the received timing information. In some examples, a UE may perform a cell selection after a UE is switched on, and may perform a cell reselection at other times. Thus, the UE may perform a delay-based (e.g., based on difference in timing information) cell selection procedure or a delay-based cell reselection procedure in communication networks (e.g., non-terrestrial networks) using the received timing information. In some examples, a difference in timing information may be referred to as a propagation delay. For cell selection or cell reselection in communication networks, a UE may receive, from a base station, a control signal indicating a type of time difference to be used for selecting a cell. A base station may indicate whether to perform an absolute time-based delay measurement or a relative time-based delay measurement or both. In an absolute time-based delay measurement, the UE uses recorded times (recorded by the UE) to select or reselect a cell. For instance, the base station may indicate that the UE may perform absolute time-based delay measurement when one or more cells report timing information including a timestamp indicating a time of a common time source (e.g., universal time source). Additionally or alternatively, the base station may indicate that the UE may perform relative time-based delay measurement when one or more cells report timing information relative to a time source. For instance, each of a set of cells (where each non-terrestrial communications device is configured as a cell) may indicate a time difference relative to a common time source. The UE may use the time difference relative to the common time source to select or reselect a cell.

In some examples, a UE may receive a first timing information associated with a first cell and a second timing information associated with a second cell. For instance, a first non-terrestrial communications device (e.g., satellite) may transmit the first timing information and a second non-terrestrial communications device (e.g., satellite) may transmit the second timing information. The UE may calculate a propagation delay based on the type of delay measurement (absolute time-based delay measurement or a relative time-based delay measurement). For example, the UE may determine a time of reception of a downlink signal from each of the non-terrestrial communications devices and may calculate the propagation delay using the time of receptions. The UE may then select or reselect a cell based on the propagation delay. In some examples, the propagation delay may be based on the first timing information and the second timing information. In some examples, the UE may receive a pre-determined frame (having a common system frame number) from multiple cells and may select a cell based on the time of arrival of each frame. Additionally or alternatively, the UE may receive messages with timestamps from multiple cells and may select a cell based on the time of arrival of each message. In some examples, each cell may indicate messages including a time difference relative to a common time source, and the UE may select a cell based on the time of arrival of each message. In some examples, a UE may receive timing information associated with synchronization signal blocks and the UE may select a cell corresponding to a synchronization signal block based on the timing information. The UE and a communications device (e.g., non-terrestrial communications device) may then communicate based on the cell selection procedure.

Communications devices having the capability to use delay-based cell selection for wireless communications may utilize the techniques described herein to experience power savings, such as extended battery life, by using delay instead of power to select or reselect a cell. In particular, using delay-based cell selection or reselection (instead of reference signal received power-based cell selection or reselection) ensures reliable and efficient communications between UEs, non-terrestrial communications devices and base stations, due to the large distance between UEs and non-terrestrial communications devices. Particular aspects of the subject matter described in this disclosure may be implemented to realize one or more enhancements. Additionally or alternatively, the techniques employed by the described UEs may provide time savings as the UE may reliably select a cell using timing information instead of power information. In some examples, the UEs may support high reliability and low latency communications, among other examples, in accordance with one or more aspects of the present disclosure. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to delay-based cell selection or cell reselection for communication networks.

FIG. 1 illustrates an example of a wireless communications system 100 that supports delay-based cell selection or cell reselection for communication networks in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the techniques for delay-based cell selection or reselection as described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM. In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource 190 may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals used to determine a duration of transmission for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource 190 may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105

(e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the radio resource control protocol layer may provide establishment, configuration, and maintenance of a radio resource control connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 157, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 157, the DU 165, and the RU 170. The split of functionality between the CU 157, DU 165, and RU 175 is flexible and as such gives rise to numerous permutations of different functionalities depending upon which functions (e.g., MAC functions, baseband functions, radio frequency functions, and any combinations thereof) are performed at the CU 157, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 157, DUs 165, and RUs 170 and may be referred to as donor base stations 105 or IAB donors. One or more DUs 165 (e.g., and/or RUs 170) associated with a donor base station 105 may be partially controlled by CUs 157 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 157 and at least one DU 165 (e.g., and RU 170), where the CU 157 may communicate with the core network 130 over an NG interface (e.g., some backhaul link). The CU 157 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 157. The DU 165 may support one or multiple different cells. IAB donor and IAB nodes 104 may communicate over an F1 interface according to some protocol that defines signaling messages (e.g., F1 AP protocol). Additionally, CU 157 may communicate with the core network over an NG interface (which may be an example of a portion of backhaul link), and may communicate with other CUs 157 (e.g., a CU 157 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 157 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 157 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for using timing information to select or reselect a cell, as described herein. In some examples, the techniques described herein may be configured to support cell selection or reselection in non-terrestrial networks with large round trip times in random access channel procedures. For example, some operations described as being performed by a UE 115 or a base station 105 may additionally or alternatively be performed by components of the disaggregated RAN architecture (e.g., IAB nodes, DUs, CUs, etc.).

A wireless multiple-access communications system may include a number of base stations or network access nodes, each simultaneously supporting communication for multiple communications devices, which may be otherwise known as UE. In some wireless communications system, a base station and a UE may implement beamforming to initiate and continue communication.

Wireless communications system 100 may also include one or more satellites 160. Satellite 160 may communicate with base stations 105 and UEs 115 (or other high altitude or terrestrial communications devices). In some examples, a gateway may serve as a relay between satellite 160 and base station 105. Satellite 160 may be any suitable type of communication satellite configured to relay communications between different end nodes in a wireless communication system. Satellite 160 may be an example of a space satellite, a balloon, a dirigible, an airplane, a drone, an unmanned aerial vehicle, a high-altitude platform system (HAPS), and/or the like. In some examples, the satellite 160 may be in a geosynchronous or geostationary earth orbit, a low earth orbit (LEO) or a medium earth orbit. A satellite 160 may be a multi-beam satellite configured to provide service for multiple service beam coverage areas in a predefined geographical service area. The satellite 160 may be any distance away from the surface of the earth.

In some cases, a cell may be provided or established by a satellite 160 as part of a non-terrestrial network. A satellite 160 may, in some cases, perform the functions of a base station 105, act as a bent-pipe satellite, or may act as a regenerative satellite, or a combination thereof. In some cases, a base station 105 may be within a satellite 160. In other cases, satellite 160 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from UL frequencies to DL frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 160) may receive a signal from a base station 105 and may relay the signal to a UE 115 or base station 105, or vice-versa.

UEs 115 may communicate with satellites 160 and/or base stations or gateways 105 using communications links 125. In some cases, timing adjustments to account for propagation delay in communications links 125 via a satellite 160 may include a propagation delay between a UE 115 and a satellite 160, a propagation delay between a base station 105 and a satellite 160, as well as a variation in the propagation delays due to movement of the satellite. In accordance with various techniques discussed herein, the UE 115 may perform cell selection based on the propagation delays between satellite 160 and UE 115. Thus, one or more aspects described herein using timing information (instead of power information) to select or reselect a cell in a non-terrestrial network may provide for efficient communications.

One or more aspects of the present disclosure provide for wireless communications systems to perform cell selection procedure using timing information. In particular, one or more aspects of the present disclosure, a UE communications manager 102 at the UE 115 may perform a delay-based cell selection procedure in non-terrestrial networks. The UE communications manager 102 at the UE 115 may receive a control signal indicating a type of time difference to be used for performing a cell selection procedure or cell reselection procedure. The base station 105 may transmit the control signaling using base station communications manager 101. The type of delay measurement may include an absolute time-based delay measurement or a relative time-based delay measurement or both.

In some examples, the UE communications manager 102 at the UE 115 may receive a first timing information associated with a first cell and a second timing information associated with a second cell. The first cell may be associated with a first non-terrestrial device and the second cell may be associated with a second non-terrestrial device. For example, the satellite 160 may transmit the first timing information using the satellite communications manager 103 and the satellite 160 may transmit the second timing information using the satellite communications manager 103. In some examples, the first cell and the second cell may be associated with a common non-terrestrial device. The base station 105 may be an example of a non-terrestrial device. The UE 115 may calculate a propagation delay based on the type of delay measurement and may transmit a random access preamble to a selected cell based on the propagation delay. As depicted herein, the UE communications manager 102 at the UE 115 may communication with a satellite communications manager 103 at a non-terrestrial communications device (e.g., satellite 160).

Figure 2A:
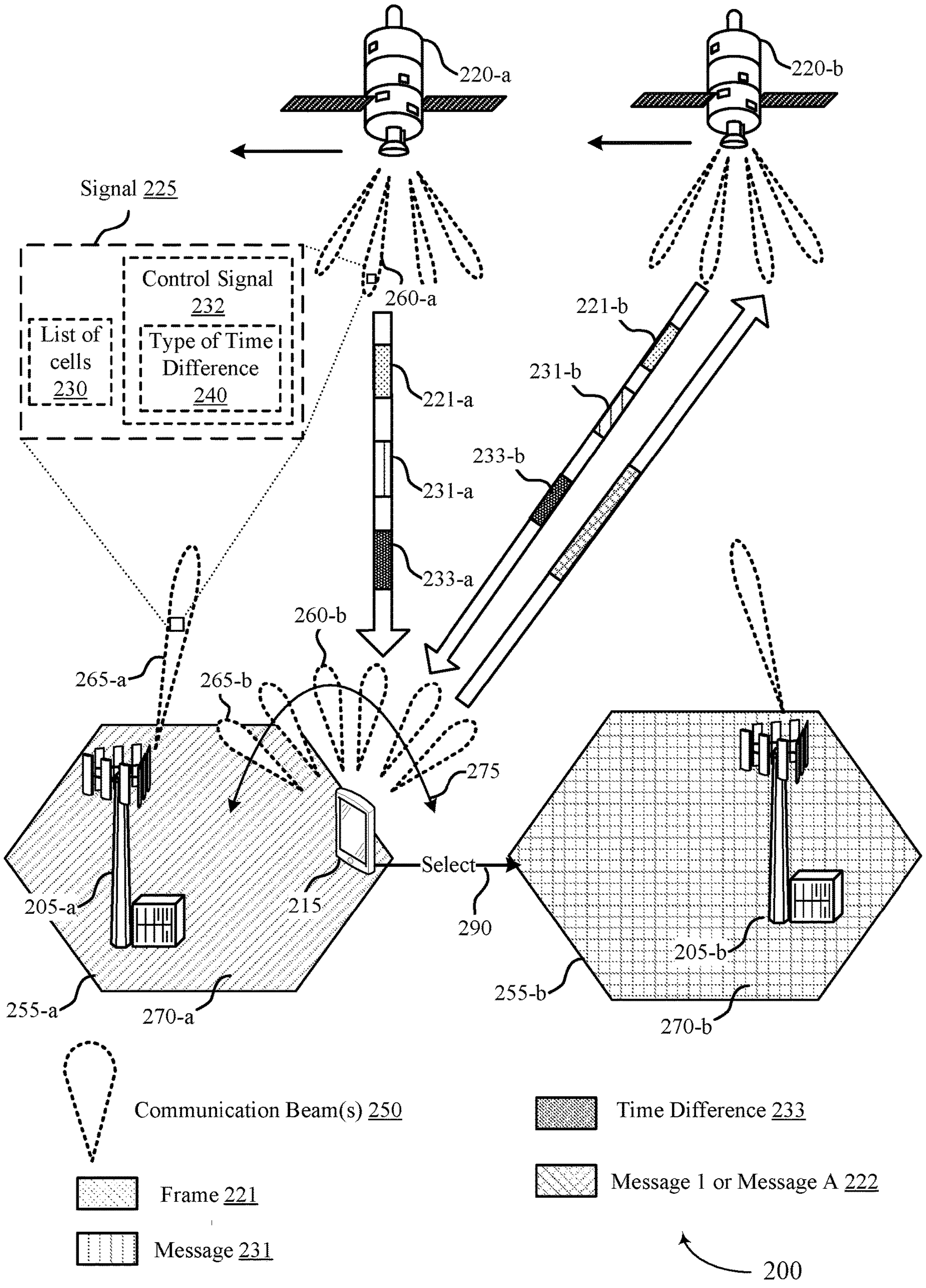
FIG. 2A illustrates an example of wireless communications system that supports delay-based cell selection for communication networks in accordance with one or more aspects of the present disclosure.

FIG. 2A illustrates an example of a wireless communications system 200 that supports delay-based cell selection for communication networks in accordance with one or more aspects of the present disclosure. In some examples, the wireless communications system 200 may implement aspects of wireless communications system 100. The wireless communications system 200 may include one or more base stations 205 (e.g., base station 205-*a* and base station 205-*b*), one or more UEs 215, and one or more communications devices 220 (e.g., satellites). For example, the wireless communications system 200 includes communications device 1 220-*a* and communications device 2 220-*b*. The base stations 205 (e.g., base station 205-*a* and base station 205-*b*) and one or more communications devices 220 described in FIG. 2A may be examples of the base stations 105 described with reference to FIG. 1. Additionally or alternatively, the one or more communications devices 220 may be examples of non-terrestrial devices, such as satellites 160. In some examples, the base station 205 may be referred to as a network device and/or a next generation NodeB (gNB). The UE 215 may be an example of a UE 115 described with reference to FIG. 1. The base station 205 may be an example of a serving base station 105 for UE 215. Although not depicted herein, the communication between a base station (e.g., base station 205-*a*) and a satellite (e.g., satellite 220-*a*) may be assisted by a gateway which relays traffic over a communication link that may be referred to as a feeder link. Although not depicted herein, other base stations may be examples of neighboring base stations 105 and may be present in the wireless communications system 200.

The wireless communications system 200 may illustrate operations of and communications between the base station 205, the UEs 215 and one or more communications devices 220 that support delay-based cell selection or cell reselection for communication networks to increase accuracy for communications using timing measurements for cell selection or reelection. In some examples, the UE 215 may perform cell selection after the UE 215 is switched on. The UE 215 may perform cell reselection at other times. For example, the wireless communications system 200 may provide for delay-based cell selection or cell reselection in non-terrestrial networks. As depicted herein, each communications device 220 (e.g., communications device 220-*a* and communications device 220-*b*) may provide a cell 255. In the example of FIG. 2A, the communications device 220-*a* (e.g., satellite 220-*a*) assisted by the base station 205-*a* may provide the cell 255-*a*. Additionally, the communications device 220-*b* (e.g., satellite 220-*b*) assisted by the base station 205-*b* may provide the cell 255-*b*. In some examples, multiple cells 255 may be associated with a communications device 220. In some examples, a base station 205 may be associated with a cell 255 and can provide service for a UE 215 within the coverage area 270 of the cell 255 (e.g., coverage area 270-*a* of the cell 255-*a* and coverage area 270-*b* of the cell 255-*b*). The UE 215 may move within the coverage area 270, and the cell 255 may provide wireless communications to UE 215. In some cases, UE 215 may be allocated a bandwidth part to communicate with a serving base station. In the example of FIG. 2A, the UE 215 may move within the coverage area 270-*a* of the cell 255-*a* and may communicate with the base station 205-*a*. Some examples of the wireless communications system 200 may support receiving timing information from the satellites 220. The UE 215 may then calculate a time difference using an absolute time-based time difference or relative time-based time difference resulting in an improved timing accuracy for cell selection in the non-terrestrial network. Additionally or alternatively, the UE 215 may communicate with a first communications device 220-*a* (device 1) and a cell 255-*a* associated with the first communications device 220-*a* (device 1) may provide communication service for the UE 215. According to one or more examples, techniques depicted herein provide for the UE 215 to select a second cell 255-*b* associated with the second communications device 220-*b* (device 2).

In some cases, a cell 255 may be provided or established by a satellite 220-*a* as part of a non-terrestrial network. In some examples, the communications device 220-*a* may perform the functions of a base station 105, act as a bent-pipe satellite, or may act as a regenerative satellite, or a combination thereof. A bent-pipe transponder or satellite may be configured to receive signals from ground stations and transmit those signals to different ground stations. While acting as a bent-pipe satellite, the communications device 220-*a* may communicate with the base station 205-*a* (e.g., using a set of communication beams 250) and forward transmissions to the UE 215 via a gateway. Additionally or alternatively, the communications device 220-*b* may communicate via a gateway with the base station 205-*b* (e.g., using the set of communication beams 250) and forward transmissions to the UE 215. In some examples, the communications device 220-*a* and the communications device 220-*b* may be examples of regenerative satellites. In some examples, the wireless communications system 200 may support mixed payload types where the communications device 220-*b* may be configured to receive signals from base station 205-*a*. Although FIG. 2A illustrates an example of bent-pipe satellites, it may be understood that the connections between the communications devices 220 and the corresponding base station 205 are optional.

In some instances, the wireless communications system 200 may support beamformed communications, where a base station 205, the UE 215, and the one or more communications device 220 may communicate using directional, beamformed transmissions. As depicted herein, the wireless communications system 200 may support handling cell selection in non-terrestrial networks. The wireless communications system 200 may support a beam management procedure to enhance communications efficiency in a wireless communications system. The wireless communications system 200 may enable the use of timing information for efficient communication between a transmitter and a receiver (e.g., communications device 220 and UE 215). In some examples, the wireless communications system 200 may support timing signaling on several channels (e.g., over several connections).

According to one or more aspects, the base station 205, the UE 215 and/or the one or more communications device 220 may perform a beam management procedure in order to find at least one beam pair for communication (including communication beam 260-*a* and communication beam 260-*b*). In some examples, the base station 205 may perform a beam management procedure with the UE 215. Additionally or alternatively, the one or more communications devices 220 may perform a beam management procedure with the UE 215. The base station 205 and the one or more communications devices 220 (e.g., non-terrestrial devices) may be configured with multiple antennas, which may be used for directional or beamformed transmissions (e.g., beamformed communication beams 250). Similarly, the UE 215 may be configured with multiple antennas, which may be used for directional or beamformed transmissions (e.g., beamformed communication beams 250). In some examples, the beam management procedure may include a beam sweep procedure 275-*a*. As depicted in the example of FIG. 2A, the UE 215 and/or the one or more communications device 220 may transmit a number of beamformed communication beams 250 in different directions within a coverage area.

In some examples, the base station 205 may communicate with the UE 215 on an active communication beam 265-*a*, and the UE 215 may communicate with the base station 205 on an active communication beam 265-*b*. Additionally or alternatively, a communications device 220 (e.g., communications device 220-*a* or communications device 220-*b*) may communicate with the UE 215 on an active communication beam 260-*a*, and the UE 215 may communicate with the communications device 220 on an active communication beam 260-*b*. The active communication beam may be used for transmitting a transmission, such as data and control information. The active communication beam may be a downlink receive beam and an uplink transmit beam for the UE 215, or a downlink transmit beam and an uplink receive beam for the base station 205. In the example of FIG. 2A, the active communication beam 260-*a* and the active communication beam 265-*a* are downlink communication beams and the active communication beam 260-*b* and the active communication beam 265-*b* are uplink communication beams. In some aspects, an active communication beam may change, for example, due to mobility, interference, blockage, and the like.

In non-terrestrial networks, a UE may frequently switch from one satellite to another satellite due to the relative high mobility between the UE and the satellites. A satellite may form many narrow beams, which may share multiple channels. In the example of FIG. 2A, one or more communications devices 220 may be examples of non-terrestrial devices (e.g., satellites). Additionally or alternatively, a satellite may be configured as one cell 255 or multiple cells 255-*a* and 255-*b* (e.g., each cell may include of a subset of the beams from a satellite). One or more aspects of the present disclosure may provide for cell selection techniques in non-terrestrial networks. In the example of FIG. 2A, the UE 215 selects 290 cell 255-*b* for communications. In some examples, the UE 215 may select 290 a cell after being switched on.

In non-terrestrial networks, it may be assumed that a line of sight exists between a UE and a non-terrestrial communications device (e.g., communications devices 220) due to the large distance between the UE and the non-terrestrial communications device. For cell selection in non-terrestrial networks, a UE 215 may use propagation delays. For instance, the UE 215 may receive a first timing information associated with a first cell 255-*a* and a second timing information associated with a second cell 255-*b*. In the example of FIG. 2A, the first communications device 220-*a* (device 1) may be associated with the first cell 255-*a* and the second communications device 220-*b* (device 2) may be associated with the second cell 255-*a*. The UE 215 may then select 290 a cell 255-*b*, and transmit a random access preamble (e.g., message 1 or message A 222) to a selected cell 255-*b* based on a propagation delay calculated in accordance with a type of delay measurement (e.g., type of time difference 240). The UE 215 may transmit an uplink shared channel after transmitting the random access preamble. In some examples, the cell selection procedure may involve communication between the UE 215 and the core network (e.g., core network 130 as described in FIG. 1) at the non-access stratum (NAS). Although not depicted in the example of FIG. 2A, it is to be understood that the NAS is functional layer in a wireless telecom protocol stacks between the core network and UE 215. In some examples, the propagation delay may be based on the first timing information and the second timing information. Some techniques for determining the positioning of UE 115 a may include network-assisted Global Navigation Satellite System (GNSS) techniques (e.g., Global Positioning System (GPS)), barometric pressure sensing, wireless local area network (WLAN) signaling, Bluetooth signaling, and Terrestrial Beacon System techniques, among others. In some examples, the propagation delay estimated by the UE 215 may be calculated based on the satellite ephemeris information and the UE 215 location provided from GNSS. In some examples, the satellite ephemeris information may include information associated with a location and timing of a satellite. In some examples, the UE 215 may receive the satellite ephemeris information in a message 231 (e.g., message 231-*a* and message 231-*b*).

According to one or more aspects of the present disclosure, the UE 215 may optionally receive a signal 225 from the base station 205 (e.g., via transmissions forwarded by the communications device 220-*a* using active communication beam 260-*a*). The signal 225 may include a control signaling indicating a type of time difference 240 to be used by the UE 215 for performing cell selection (e.g., by determining propagation delay). For instance, the base station 205 may indicate whether to perform an absolute time-based delay measurement or a relative time-based delay measurement or both. The UE 215 may further receive a configuration (indicated via signal 225) indicating a list of cells 230. For instance, the base station 205 may indicate a list of cells 230 for measurement of time difference at the UE 215. In the example of FIG. 2A, the list of cells 230 may include information identifying the cell 255-*a* and the cell 255-*b*. In some examples, the UE 215 may determine that the first cell 255-*a* and the second cell 255-*b* are included in the list of cells 230 based on receiving the configuration. The UE 215 may then calculate the propagation delay based on determining that the first cell 255-*a* and the second cell 255-*b* are included in the list of cells 230.

In some examples, the UE 215 may receive one or more frames 221 from the communications devices. For example, the UE 215 may receive a first frame 221-*a* from the first cell 255-*a* and a second frame 221-*b* from the second cell 255-*b*. As depicted in the example of FIG. 2A, the UE 215 may receive the first frame 221-*a* from the first communications device 220-*a* (device 1) and the second frame 221-*b* from the second communications device 220-*b* (device 2). The first frame 221-*a* and the second frame 221-*b* may be associated with a common time instant. For example, multiple cells 255 may transmit a pre-determined frame (e.g., a frame with a common system frame number (SFN)) at a common time instant (e.g., time instant 0). That is, the first frame 221-*a* and the second frame 221-*b* may be associated with a common system frame number (e.g., system frame number 0). The UE 215 may record the time of receiving the pre-determined frame (e.g., the start of the frame) from each cell 255. For instance, the UE 215 may determine a first time of arrival associated with the first frame 221-*a* and a second time of arrival associated with the second frame 221-*b*. The UE 215 determine when the first frame 221-*a* is received at the UE 215 and when the second frame 221-*b* is received at the UE 215. The UE 215 may then select 290 a cell 255-*b* based on the recorded times. For example, the UE 215 may select 290 the cell 255-*b* with the earliest recorded time. In some examples, the UE 215 may reselect a cell with an earliest recorded time. In some examples, the UE 215 may calculate the propagation delay based on the first time of arrival associated with the first frame 221-*a* and the second time of arrival associated with the second frame 221-*b*.

According to one or more aspects, the UE 215 may select the cell 255-*a* (not shown) associated with the first communications device 220-*a* (device 1) based on determining that the first time of arrival is earlier than the second time of arrival. In some examples, the UE 215 may perform a random access to the selected cell 255-*a* as the result of cell selection. Alternatively, the UE 215 may select the second cell 255-*a* associated with the second communications device 220-*b* (device 2) based on determining that the second time of arrival is earlier than the first time of arrival. In some examples, the UE 215 may perform a random access to the selected cell 255-*b* as the result of cell selection. In some examples, the UE 215 may reselect the cell 255-*b*. In some examples, the UE 215 performing a random access with the selected cell 255-*b* may include sending a message 1 222 in the case of 4-step random access channel or a message A 222 in the case of 2-step random access channel to that cell 255-*b*. In some examples, the message 1 222 in the case of 4-step random access channel may include a physical random access channel preamble and the message A 222 in the case of 2-step random access channel may include a physical random access channel preamble and a physical uplink shared channel. Using system frame number in selecting the cell may resolve any ambiguity because the repetition cycle is larger than the propagation delay in a wireless communications system supporting non-terrestrial networks (e.g., system frame number repeats every 1024 frames, each being 10 ms).

In some examples, the UE 215 may receive a first message 231-*a* from the first cell associated with the first communications device 220-*a* (device 1) and a second message 231-*b* from the second cell associated with the second communications device 220-*b* (device 2). The first message 231-*a* may be associated with a first timestamp and the second message 231-*b* may be associated with a second timestamp. For example, each cell 255 may transmit a message with a timestamp. The message 231 may include a system information block message (e.g., system information block 9 message) with a coordinated universal time. The UE 215 may determine a first time of arrival associated with the first message 231-*a* and a second time of arrival associated with the second message 231-*b*. For example, the UE 215 may record the time of receiving the message from each satellite, and compute the time difference. The time difference may be computed according to equation (1):

$$\Delta(i)=L(i)-T(i) \quad \text{Equation (1)}$$

where T(i) is the time stamp in the message transmitted by satellite i and L(i) is the time when the message is received at the UE 215.

In some examples, the UE 215 may calculate the propagation delay based on a first time difference between the first timestamp included in the first message 231-*a* and the first time of arrival and a second time difference between the second timestamp included in the second message 231-*b* and the second time of arrival. The UE 215 may then select the cell 255 based on the computed time differences Δ(i). For instance, the UE 215 may select the cell 255-*b* with a lower time difference (as the UE is moving towards the selected cell 255-*b*). The UE 215 may select the first cell based on determining that the first time difference is less than the second time difference (not shown). Alternatively, the UE 215 may select the second cell 255-*b* based on determining that the second time difference is less than the first time difference. As depicted herein, the UE 215 selecting a cell 255 may involve a random access procedure (e.g., sending a message 1 in the case of 4-step random access channel or a message A in the case of 2-step random access channel) with that cell 255. For example, if the UE 215 selects the second cell 255-*b*, the UE 215 may transmit a random access preamble (e.g., message 1 or message A 222) to the second communications device 220-*b* (device 2).

According to one or more aspects, each cell 255 may indicate a time difference 233 relative to a common time source. The UE 215 may receive messages (time difference 233-*a* and time difference 233-*b* may each include time difference relative to a common time source) including the time difference indication 233 and may select a cell based on the times at which the messages are received at the UE 215. The UE 215 may receive a first time indication 233-*a* from the first cell 255-*a* and a second time indication 233-*b* from the second cell 255-*b*. In some examples, the first time indication and the second time indication may be associated with a common time source. The first time indication 233-*a* or the second time indication 233-*b* or both may be included in at least one of a system information block, a radio resource control signal, a MAC control element, or a combination thereof.

The UE 215 may receive the time difference indication 233 (which may be mapped to a time difference δ(i)), and records the time t(i) at which the indication is received for each cell i. For example, the UE 215 may determine a first time of arrival associated with the first time indication 233-*a* and a second time of arrival associated with the second time indication 233-*b*. The UE 215 may then calculate the propagation delay based on a first time difference between the first time indication 233-*a* and the first time of arrival and a second time difference between the second time indication 233-*b* and the second time of arrival. According to one or more aspects, the UE 215 may select a cell (e.g., second cell 255-*b*) based on the time difference and the time of receiving the indication. For example, the UE 215 may select the cell 255-*b* with the smallest d(i), where d(i) is calculated according to equation (2):

$$d(i)=t(i)-\delta(i) \quad \text{Equation (2)}$$

In some examples, the UE 215 may select the first cell 255-*a* (not shown) based on determining that the first time difference may be less than the second time difference. In some examples, the UE 215 may select the second cell 255-*b* based on determining that the second time difference may be less than the first time difference. In some examples, the UE 215 selecting a cell may involve a random access procedure (e.g., sending a message 1 in the case of 4-step random access channel or a message A in the case of 2-step random access channel) with the selected cell 255-*b*.

According to one or more aspects, the UE 215 may receive a first time indication (optionally included in message 231-*a*) associated with a first synchronization signal block and a second time indication (optionally included in message 231-*b*) associated with a second synchronization signal block. The first time indication and the second time indication may each include a time variance relative to a common time source. A cell may indicate a time difference relative to a time source and a UE 215 may receive a time difference indication. In some examples, the first synchronization signal block and the second synchronization signal block may be associated with a same cell or different cells. In the example of FIG. 2A, it is shown that the first time indication (optionally included in message 231-*a*) and the second time indication (optionally included in message 231-*b*) are associated with different cells 255. The UE 215 may then select a cell based on the times at which the time difference indications are received. As depicted herein, a cell 255 may indicate a time difference relative to a time source for each synchronization signal block, and different cells may use a common time source. For example, cell i may indicate the time difference between time of transmitting synchronization signal block k (included in message 231) and may indicate the reading of the time source at the time of transmitting as δ(k), k=0, 1, 2, . . . . The UE 215 may receive synchronization signal block k from cell i, and may record the time (T(i, k)) at which the synchronization signal block k is received. The synchronization signal block of a satellite received at the UE 215 may depend on a location of the UE 215 relative to the beams (e.g., a set of communication beams 250) from the satellite.

In some examples, the UE 215 may determine a first time of arrival associated with the first time indication and a second time of arrival associated with the second time indication. The UE 215 may then calculate the propagation delay based on a first time difference between the first time indication and the first time of arrival and a second time difference between the second time indication and the second time of arrival. The UE 215 may select the cell 255-*b* based on the recorded times T(i, k) and the indicated time difference δ(i, k). In some examples, an index i added to δ(k) may signify that the time difference is associated with cell i. The UE 215 may select a beam associated with the communications device 220-*b* based on the calculated propagation delay. For instance, the UE 215 may select cell I and the beam K based on equation (3).

$$(I,K)=\text{argmin}_{i,k}\{T(i,k)-\delta(i,k)\} \quad \text{Equation (3)}$$

where the set {T(i, k)−δ(i, k)} may include beams from cell i received by the UE 215 as part of the synchronization signal block transmission. According to some examples, techniques depicted with reference to FIG. 2A may be used to perform cell reselection for communications networks.

Figure 2B:
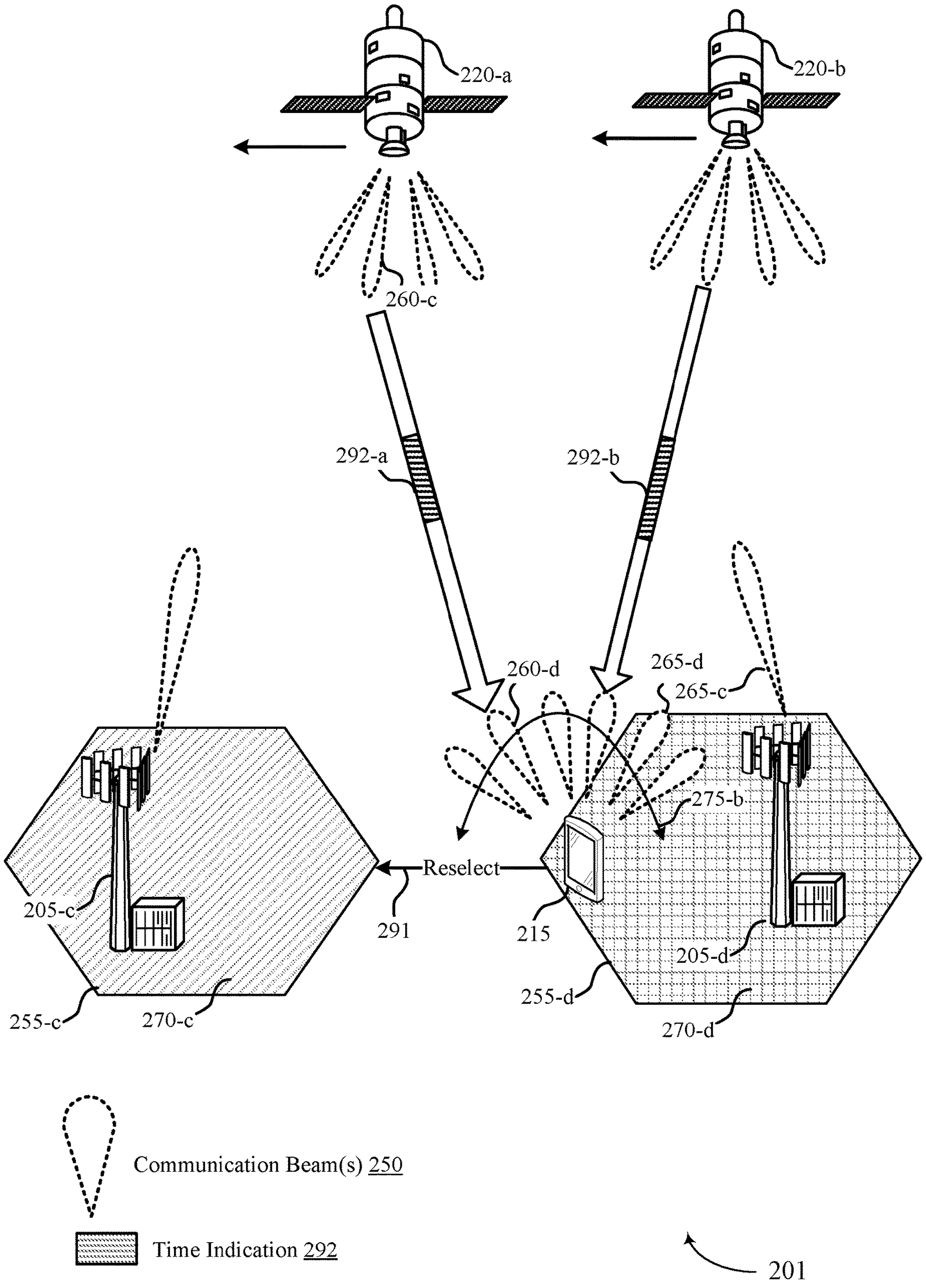
FIG. 2B illustrates an example of wireless communications system that supports delay-based cell reselection for communication networks in accordance with one or more aspects of the present disclosure.

FIG. 2B illustrates an example of a wireless communications system 201 that supports delay-based cell reselection for communication networks in accordance with one or more aspects of the present disclosure. In some examples, the wireless communications system 201 may implement aspects of wireless communications system 100 and wireless communications system 200. The wireless communications system 201 may include one or more base stations 205 (e.g., base station 205-*c* and base station 205-*d*), one or more UEs 215, and one or more communications devices 220 (e.g., satellites). For example, the wireless communications system 201 includes communications device 1 220-*c* and communications device 2 220-*d*. The base stations 205 (e.g., base station 205-*c* and base station 205-*d*) and one or more communications devices 220 described in FIG. 2B may be examples of the base stations 105 described with reference to FIG. 1. Additionally or alternatively, the one or more communications devices 220 may be examples of non-terrestrial devices, such as satellites 160. In some examples, the base station 205 may be referred to as a network device and/or a gNB. The UE 215 may be an example of a UE 115 described with reference to FIG. 1. The base station 205 may be an example of a serving base station 105 for UE 215. Although not depicted herein, the communication between a base station (e.g., base station 205-*c*) and a satellite (e.g., satellite 220-*c*) may be assisted by a gateway which relays traffic over a communication link that may be referred to as a feeder link. Although not depicted herein, other base stations may be examples of neighboring base stations 105 and may be present in the wireless communications system 201.

The wireless communications system 201 may illustrate operations of and communications between the base station 205, the UEs 215 and one or more communications devices 220 that support delay-based cell reselection for communication networks. For example, the wireless communications system 201 may provide for delay-based cell reselection in non-terrestrial networks. While the UE 215 may select a cell (as depicted in FIG. 2A) after being switched on, the UE 215 may reselect 291 a cell at other times. In some examples, the delay-based cell reselection may occur after a cell selection as described with reference to FIG. 2A. In some examples, the UE 215 may select a cell (e.g., cell 255-*d*) after being switched on. The UE 215 may camp on the cell 255-*d* and reselect 291 another cell (e.g., cell 255-*c*). The wireless communications system 201 may use the techniques depicted with reference to FIG. 2B to reselect 291 a cell (e.g., cell 255-*c*) for communications. As depicted herein, each communications device 220 (e.g., communications device 220-*c* and communications device 220-*d*) may provide a cell 255. In the example of FIG. 2B, the communications device 220-*c* (e.g., satellite 220-*c*) assisted by the base station 205-*c* may provide the cell 255-*c*. Additionally, the communications device 220-*d* (e.g., satellite 220-*d*) assisted by the base station 205-*d* may provide the cell 255-*d*. In some examples, multiple cells 255 may be associated with a communications device 220. In some examples, a base station 205 may be associated with a cell 255 and can provide service for a UE 215 within the coverage area 270 of the cell 255 (e.g., coverage area 270-*c* for the cell 255-*c* and coverage area 270-*d* for the cell 255-*d*).

According to one or more aspects, the base station 205, the UE 215 and/or the one or more communications device 220 may perform a beam management procedure in order to find at least one beam pair for communication (including communication beam 260-*c* and communication beam 260-*d*). In some examples, the base station 205 may perform a beam management procedure with the UE 215. Additionally or alternatively, the one or more communications devices 220 may perform a beam management procedure with the UE 215. The base station 205 and the one or more communications devices 220 (e.g., non-terrestrial devices) may be configured with multiple antennas, which may be used for directional or beamformed transmissions (e.g., beamformed communication beams 250). Similarly, the UE 215 may be configured with multiple antennas, which may be used for directional or beamformed transmissions (e.g., beamformed communication beams 250). In some examples, the beam management procedure may include a beam sweep procedure 275-*b*.

In the example of FIG. 2B, the UE 215 may receive time indication 292. For example, the UE 215 may receive a first time indication 292-*a* from the first communications device 220-*c* (e.g., satellite 220-*c*) and a second time indication 292-*b* from the first communications device 220-*d* (e.g., satellite 220-*d*). The time indications 292 may include a frame, a message, or a time difference, as described with reference to FIG. 2A. In some examples, the base station 205 may communicate with the UE 215 on an active communication beam 265-*c*, and the UE 215 may communicate with the base station 205 on an active communication beam 265-*d*. Additionally or alternatively, a communications device 220 (e.g., communications device 220-*c* or communications device 220-*d*) may communicate with the UE 215 on an active communication beam 260-*c*, and the UE 215 may communicate with the communications device 220 on an active communication beam 260-*d*.

In the example of FIG. 2B, the UE 215, upon receiving the first time indication 292-*a* and the second time indication 292-*b*, the UE 215 may then reselect 291 a cell 255-*c* based on a propagation delay (e.g., delay between the time of arrival of the time indication 292-*a* and the time indication 292-*b*). As described with reference to FIG. 2A, the UE 215 may receive frames (included in the time indications 292). The UE 215 may record the time of receiving the frames from each cell 255, and may determine a time of arrival based on the time recorded at the UE 215. Based on the recorded times, the UE 215 may reselect 291 the cell 255-*c*. For example, the UE 215 may determine that the cell 255-*c* is the closest cell (based on receiving the time indication 292-*a* prior than the time indication 292-*b*) and may reselect 291 the cell 255-*c*.

Figure 3:
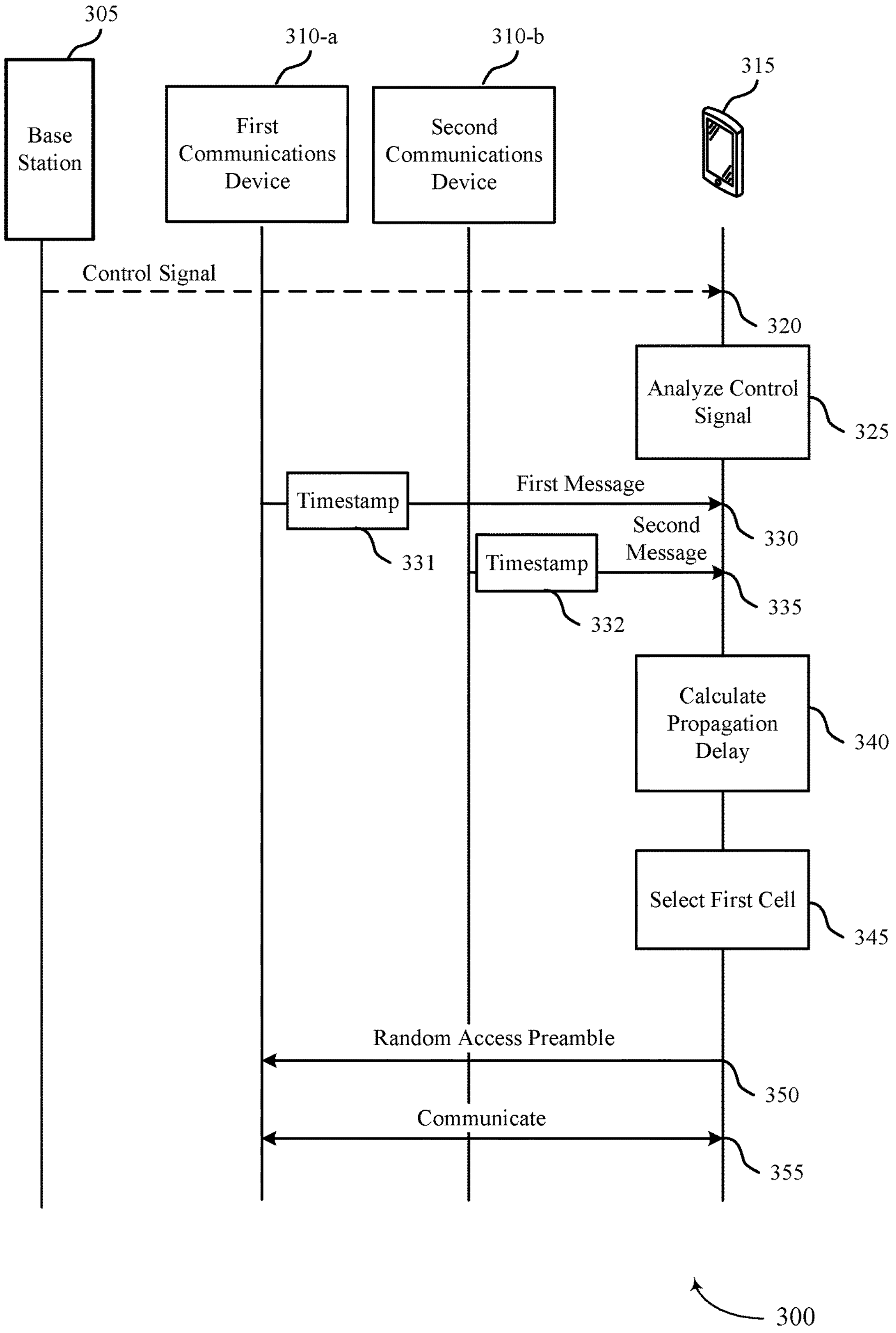
FIG. 3 illustrates an example of a process flow that supports delay-based cell selection or cell reselection for communication networks in accordance with one or more aspects of the present disclosure.

FIG. 3 illustrates an example of a process flow 300 that supports delay-based cell selection or cell reselection for communication networks in accordance with one or more aspects of the present disclosure. In some examples, the process flow 300 that supports delay-based cell reselection or reselection for communication networks in accordance with one or more aspects of the present disclosure. In some examples, process flow 300 may implement aspects of wireless communications system 100 and wireless communications system 200. A first communications device 310-*a* may be an example of a first non-terrestrial device and a second communications device 310-*b* may be an example of a second non-terrestrial device. In some examples, non-terrestrial devices may be examples of a base station 105 described with reference to FIGS. 1 and 2. A UE 315 may be an example of a UE 115 described with reference to FIGS. 1 and 2 and a base station 305 may be an example of a base station 105 described with reference to FIGS. 1 and 2.

In the following description of the process flow 300, the operations between the base station 305, the first communications device 310-*a*, the second communications device 310-*b* and the UE 315 may be transmitted in a different order than the exemplary order shown. The operations performed by the base station 305, the first communications device 310-*a*, the second communications device 310-*b* or the UE 315 may be performed in different orders or at different times than the exemplary order shown. Some operations may also be omitted from the process flow 300, or other operations may be added to the process flow 300. Further, the base station 305, the first communications device 310-*a*, the second communications device 310-*b* and the UE 315 are not limiting, as the described features may be associated with any number of different devices.

At 320, the base station 305 may optionally transmit a control signaling indicating the type of delay measurement. For example, the base station 305 may indicate the type of delay measurement to be performed by the UE 315. In some examples, the type of delay measurement may include an absolute time-based delay measurement or a relative time-based delay measurement or both. Additionally or alternatively, the base station 305 may transmit a configuration indicating a set of cells to be measured by the UE 315.

Upon receiving the configuration from the base station 305 (not shown), at 325, the UE 315 may analyze the received information to determine whether a first cell and a second cell are included in the set of cells indicated by the base station 305. In some examples, the UE 315 may determine that the first cell and the second cell are included in the set of cells based on receiving the configuration. Although depicted as different communications devices, it may be understood that first cell and the second cell are associated with a common communications device (e.g., common non-terrestrial device).

At 330, the first communications device 310-*a* may transmit a first message and at 335, the second communications device 310-*b* may transmit a second message. The first communications device 310-*a* may be associated with the first cell and the second communications device 310-*b* may be associated with the second cell. The first communications device 310-*a* may transmit a first timing information associated with the first cell at 330 and the second communications device 310-*b* may transmit a second timing information associated with the first cell at 335.

In some examples, the first communications device 310-*a* may transmit a first frame and the second communications device 310-*b* may transmit a second frame. In some examples, the first frame and the second frame may be associated with a common time instant. Additionally or alternatively, the first frame and the second frame may be associated with a common system frame number.

In some examples, the UE 315 may receive the first message from the first cell and the second message from the second cell. The first message may be associated with a first timestamp 331 and the second message may be associated with a second timestamp 332. In some examples, the first message may include a first time indication from the first cell and the second message may include a second time indication from the second cell. The first time indication or the second time indication or both may be included in at least one of a system information block, a radio resource control signal, a MAC control element, or a combination thereof.

At 340, the UE 315 may calculate a propagation delay based on receiving the first message and the second message. For example, upon receiving the first frame and the second frame, the UE 315 may determine a first time of arrival associated with the first frame and a second time of arrival associated with the second frame. The UE 315 may then calculate the propagation delay based on the first time of arrival associated with the first frame and the second time of arrival associated with the second frame.

In some examples, upon receiving the first message associated with the first timestamp and the second message associated with the second timestamp, the UE 315 may determine a first time of arrival associated with the first message and a second time of arrival associated with the second message. The UE 315 may then calculate a propagation delay based at on a first time difference between the first timestamp and the first time of arrival and a second time difference between the second timestamp and the second time of arrival.

Additionally or alternatively, upon receiving the first time indication and the second time indication associated with the common time source, the UE 315 may determine a first time of arrival associated with the first time indication and a second time of arrival associated with the second time indication. In some examples, the UE 315 may calculate a propagation delay based on a first time difference between the first time indication and the first time of arrival and a second time difference between the second time indication and the second time of arrival.

At 345, the UE 315 may select or reselect the first cell based on determining that the first time of arrival of the first message is earlier than the second time of arrival of the second message. In some examples, the UE 315 may select the first cell based on determining that the first time difference is less than the second time difference. Although it is depicted that the UE 315 selects or reselects the first cell, it may be understood that the UE 315 may select or reselect the second cell. For instance, the UE 315 may select the second cell based on determining that the second time of arrival of the second message is earlier than the first time of arrival of the first message. In some examples, the UE 315 may select the second cell based on determining that the second time difference is less than the first time difference.

At 350, the UE 315 may transmit a random access preamble to the first communications device 310-*a* associated with the first cell based on the propagation delay calculated in accordance with the type of delay measurement. As depicted herein, the propagation delay may be based on a first timing information included in the first message and a second timing information included in the second message. At 355, the UE 315 may communicate with the first communications device 310-*a* based on transmitting the random access preamble.

The operations performed by the base station 305, the first communications device 310-*a*, the second communications device 310-*b* and the UE 315 as part of, but not limited to, process flow 300 may provide improvements to communication links in wireless communications systems. Furthermore, the operations performed by the base station 305, the first communications device 310-*a*, the second communications device 310-*b* and the UE 315 as part of, but not limited to, process flow 300 may support the operation of the UE 315 while performing communications having a high reliability and low latency and while performing communications in non-terrestrial networks. For example, the described methods in the process flow 300 may support reducing the delay in wireless communications over non-terrestrial networks, among other enhancements.

Figure 4:
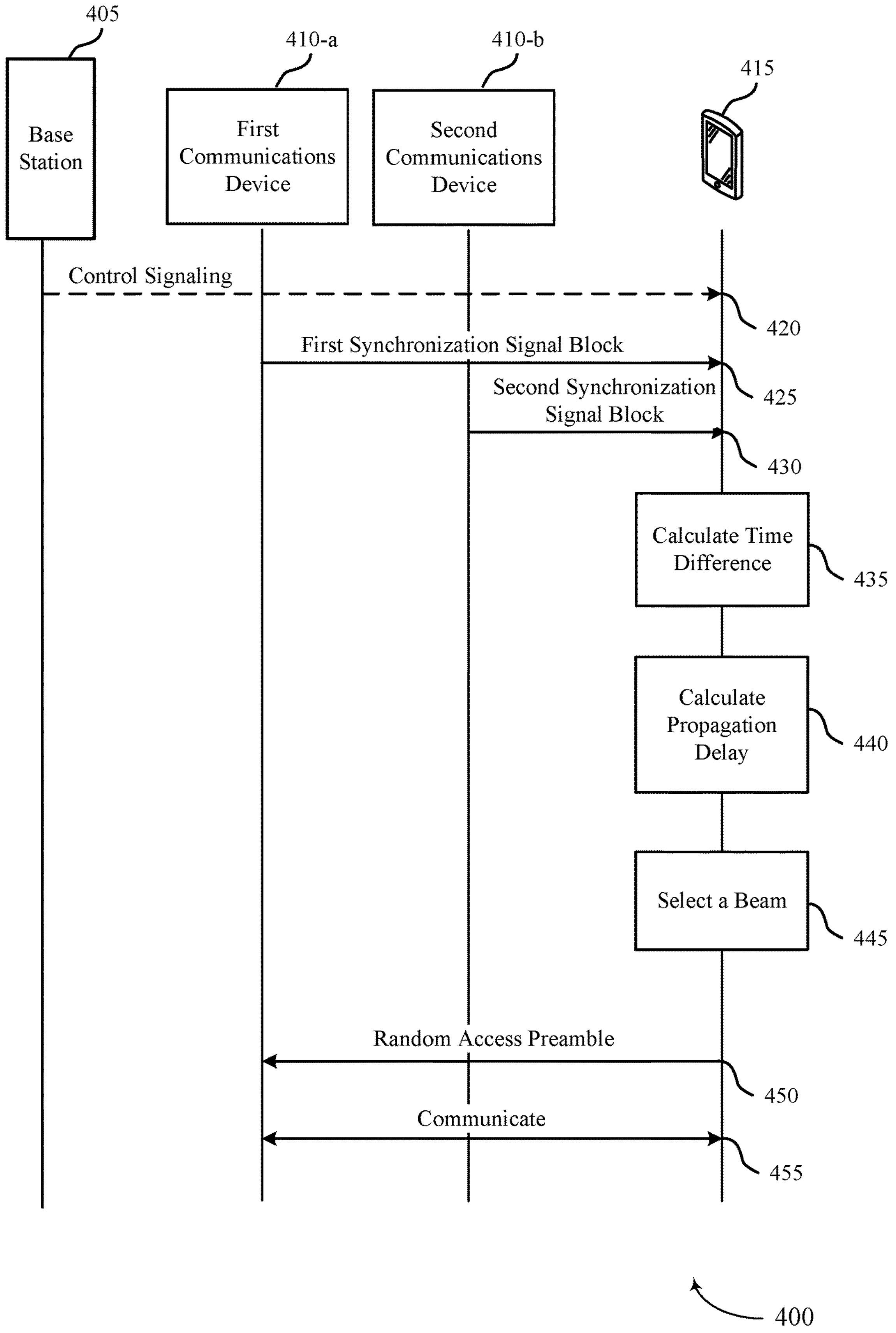
FIG. 4 illustrates an example of a process flow that supports delay-based cell selection or cell reselection for communication networks in accordance with one or more aspects of the present disclosure.

FIG. 4 illustrates an example of a process flow 400 that supports delay-based cell selection for communication networks in accordance with one or more aspects of the present disclosure. In some examples, the process flow 400 that supports delay-based cell reselection for communication networks in accordance with one or more aspects of the present disclosure. In some examples, process flow 400 may implement aspects of wireless communications system 100 and wireless communications system 200. A first communications device 410-*a* may be an example of a first non-terrestrial device and a second communications device 410-*b* may be an example of a second non-terrestrial device. In some examples, non-terrestrial devices may be examples of a base station 105 described with reference to FIGS. 1 and 2. A UE 415 may be an example of a UE 115 described with reference to FIGS. 1 and 2 and a base station 405 may be an example of a base station 105 described with reference to FIGS. 1 and 2.

In the following description of the process flow 400, the operations between the base station 405, the first communications device 410-*a*, the second communications device 410-*b* and the UE 415 may be transmitted in a different order than the exemplary order shown. The operations performed by the base station 405, the first communications device 410-*a*, the second communications device 410-*b* or the UE 415 may be performed in different orders or at different times than the exemplary order shown. Some operations may also be omitted from the process flow 400, or other operations may be added to the process flow 400. Further, the base station 405, the first communications device 410-*a*, the second communications device 410-*b* and the UE 415 are not limiting, as the described features may be associated with any number of different devices.

At 420, the base station 405 may optionally transmit a control signaling indicating the type of delay measurement. As depicted herein, the base station 405 may indicate the type of delay measurement to be performed by the UE 415. For example, the base station 405 may indicate an absolute time-based delay measurement or a relative time-based delay measurement or both. In some examples, the UE 415 may optionally analyze the received control signaling to identify a list of cells. The UE 415 may determine whether a first cell and a second cell are included in the list of cells.

At 425, the first communications device 410-*a* may transmit a first synchronization signal block and at 430, the second communications device 310-*b* may transmit a second synchronization signal block. As depicted herein, the first communications device 410-*a* may be associated with the first cell and the second communications device 410-*b* may be associated with the second cell. Although depicted as different communications devices, it may be understood that first cell and the second cell are associated with a common communications device (e.g., common non-terrestrial device). For example, a communications device may be configured as a cell. Alternatively, the communications devices may be configured as multiple cells, where each cell includes a subset of the beams from the communications device.

At 435, the UE 415 may calculate a time difference based on receiving the first synchronization signal block and the second synchronization signal block. The first synchronization signal block and the second synchronization signal block may be associated with a same cell or different cells. For example, the UE 415 may determine a first time of arrival associated with the first time indication and a second time of arrival associated with the second time indication. In some examples, the first time indication and the second time indication may each include a time variance relative to a common time source. The UE 415 may then calculate a first time difference between the first time indication and the first time of arrival and a second time difference between the second time indication and the second time of arrival.

At 440, the UE 415 may calculate a propagation delay based on receiving the first synchronization signal and the second synchronization signal. For example, the UE 415 may calculate the propagation delay based on the first time difference between the first time indication and the first time of arrival and the second time difference between the second time indication and the second time of arrival.

At 445, the UE 415 may select a beam based on the calculated propagation delay. In some examples, the UE 415 may select a cell based on the selected beam. As depicted in the example of FIG. 4, the UE 415 may select the first cell based on the selected beam. Although it is depicted that the UE 415 selects the first cell, it may be understood that the UE 415 may select the second cell. For instance, the UE 415 may select the second cell based on selecting a beam corresponding to the second cell.

At 450, the UE 415 may transmit a random access preamble to the first communications device 410-*a* associated with the first cell based on selecting the beam corresponding to the first cell. At 455, the UE 415 may communicate with the first communications device 410-*a* based on transmitting the random access preamble.

The operations performed by the base station 405, the first communications device 410-*a*, the second communications device 410-*b* and the UE 415 as part of, but not limited to, process flow 400 may provide improvements to communication links in wireless communications systems. Furthermore, the operations performed by the base station 405, the first communications device 410-*a*, the second communications device 410-*b* and the UE 415 as part of, but not limited to, process flow 400 may support the operation of the UE 415 while performing communications in non-terrestrial networks.

Figure 5:
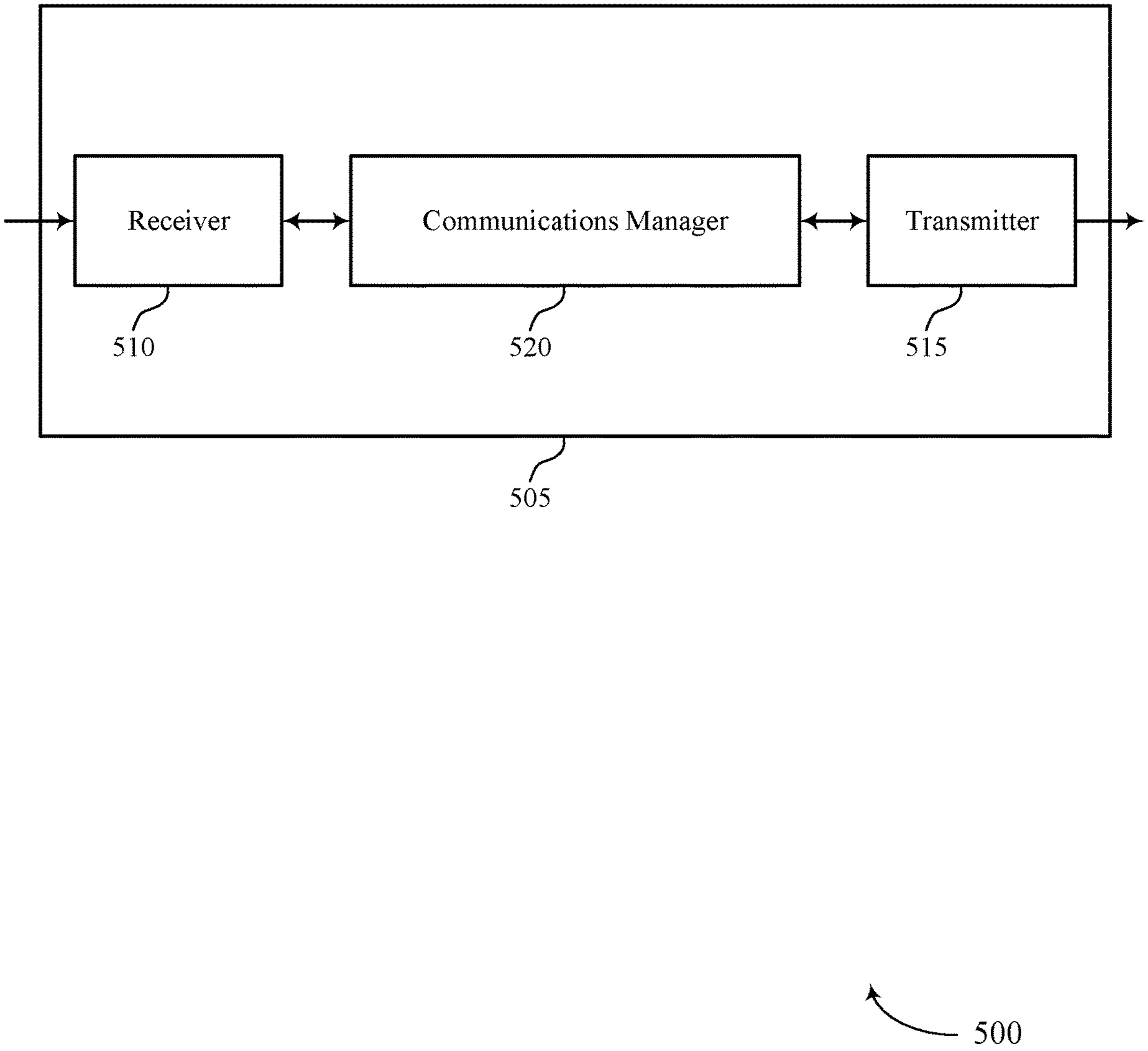
FIGS. 5 and 6 show block diagrams of devices that support delay-based cell selection or cell reselection for communication networks in accordance with one or more aspects of the present disclosure.

FIG. 5 shows a block diagram 500 of a device 505 that supports delay-based cell selection or cell reselection for communication networks in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to delay-based cell selection or cell reselection for communication networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to delay-based cell selection or cell reselection for communication networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of delay-based cell selection or cell reselection for communication networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The communications manager 520 may be an example of means for performing various aspects of delay-based cell selection or cell reselection for communication networks as described herein. The communications manager 520, or its sub-components, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a first timing information associated with a first cell and a second timing information associated with a second cell. The communications manager 520 may be configured as or otherwise support a means for selecting or reselecting a cell based on a propagation delay calculated in accordance with a type of delay measurement, the propagation delay being based on the first timing information and the second timing information.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources.

Figure 6:
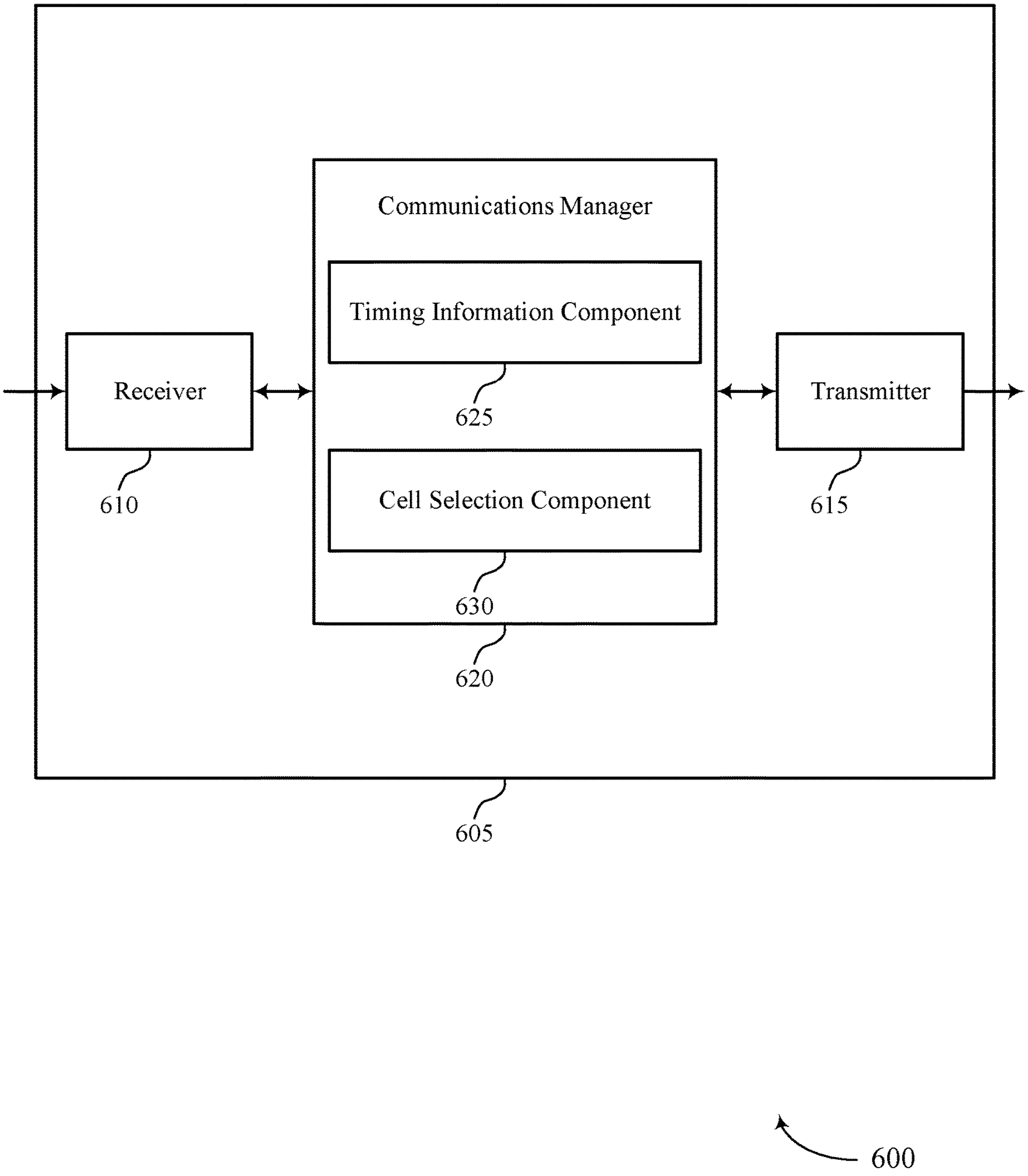

FIG. 6 shows a block diagram 600 of a device 605 that supports delay-based cell selection or cell reselection for communication networks in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to delay-based cell selection or cell reselection for communication networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to delay-based cell selection or cell reselection for communication networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of delay-based cell selection or cell reselection for communication networks as described herein. For example, the communications manager 620 may include a timing information component 625 a cell selection component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The timing information component 625 may be configured as or otherwise support a means for receiving a first timing information associated with a first cell and a second timing information associated with a second cell. The cell selection component 630 may be configured as or otherwise support a means for selecting or reselecting a cell based on a propagation delay calculated in accordance with a type of delay measurement, the propagation delay being based on the first timing information and the second timing information.

Figure 7:
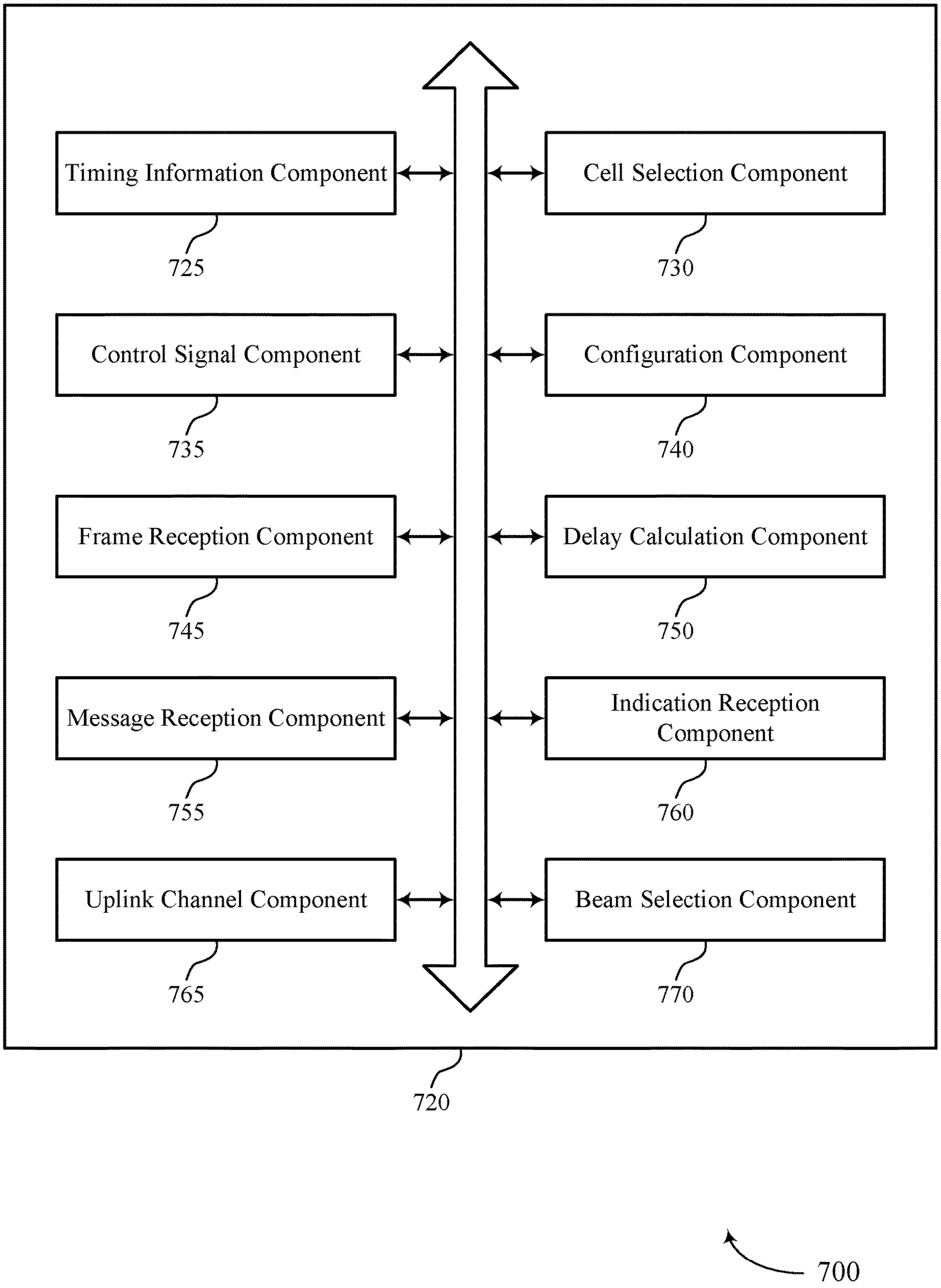
FIG. 7 shows a block diagram of a communications manager that supports delay-based cell selection or cell reselection for communication networks in accordance with one or more aspects of the present disclosure.

FIG. 7 shows a block diagram 700 of a communications manager 720 that supports delay-based cell selection or cell reselection for communication networks in accordance with one or more aspects of the present disclosure. The communications manager 720 may be an example of aspects of a communications manager 520, a communications manager 620, or both, as described herein. The communications manager 720, or various components thereof, may be an example of means for performing various aspects of delay-based cell selection or cell reselection for communication networks as described herein. For example, the communications manager 720 may include a timing information component 725, a cell selection component 730, a control signal component 735, a configuration component 740, a frame reception component 745, a delay calculation component 750, a message reception component 755, an indication reception component 760, an uplink channel component 765, a beam selection component 770, or any combination thereof. Each of these components may communicate, directly or indirectly, with one another (e.g., via one or more buses).

The communications manager 720 may support wireless communication at a UE in accordance with examples as disclosed herein. The timing information component 725 may be configured as or otherwise support a means for receiving a first timing information associated with a first cell and a second timing information associated with a second cell. The cell selection component 730 may be configured as or otherwise support a means for selecting or reselecting a cell based on a propagation delay calculated in accordance with a type of delay measurement, the propagation delay being based on the first timing information and the second timing information.

In some examples, the control signal component 735 may be configured as or otherwise support a means for receiving, from a base station, a control signaling indicating the type of delay measurement. In some examples, the configuration component 740 may be configured as or otherwise support a means for receiving, from the base station, a configuration indicating a set of multiple cells to be measured by the UE.

In some examples, the cell selection component 730 may be configured as or otherwise support a means for determining that the first cell and the second cell are included in the set of multiple cells based on receiving the configuration. In some examples, the delay calculation component 750 may be configured as or otherwise support a means for calculating the propagation delay based on determining that the first cell and the second cell are included in the set of multiple cells.

In some examples, the frame reception component 745 may be configured as or otherwise support a means for receiving a first frame from the first cell and a second frame from the second cell, where the first frame and the second frame are associated with a common time instant. In some examples, the timing information component 725 may be configured as or otherwise support a means for determining a first time of arrival associated with the first frame and a second time of arrival associated with the second frame. In some examples, the delay calculation component 750 may be configured as or otherwise support a means for calculating the propagation delay based on the first time of arrival associated with the first frame and the second time of arrival associated with the second frame.

In some examples, the cell selection component 730 may be configured as or otherwise support a means for selecting the first cell based on determining that the first time of arrival is earlier than the second time of arrival. In some examples, the cell selection component 730 may be configured as or otherwise support a means for selecting the second cell based on determining that the second time of arrival is earlier than the first time of arrival. In some examples, the first frame and the second frame are associated with a common system frame number.

In some examples, the message reception component 755 may be configured as or otherwise support a means for receiving a first message from the first cell and a second message from the second cell, where the first message is associated with a first timestamp and the second message is associated with a second timestamp. In some examples, the timing information component 725 may be configured as or otherwise support a means for determining a first time of arrival associated with the first message and a second time of arrival associated with the second message. In some examples, the delay calculation component 750 may be configured as or otherwise support a means for calculating the propagation delay based on a first time difference between the first timestamp and the first time of arrival and a second time difference between the second timestamp and the second time of arrival.

In some examples, the cell selection component 730 may be configured as or otherwise support a means for selecting the first cell based on determining that the first time difference is less than the second time difference. In some examples, the cell selection component 730 may be configured as or otherwise support a means for selecting the second cell based on determining that the second time difference is less than the first time difference.

In some examples, the indication reception component 760 may be configured as or otherwise support a means for receiving a first time indication from the first cell and a second time indication from the second cell, where the first time indication and the second time indication are associated with a common time source. In some examples, the timing information component 725 may be configured as or otherwise support a means for determining a first time of arrival associated with the first time indication and a second time of arrival associated with the second time indication. In some examples, the delay calculation component 750 may be configured as or otherwise support a means for calculating the propagation delay based on a first time difference between the first time indication and the first time of arrival and a second time difference between the second time indication and the second time of arrival.

In some examples, the cell selection component 730 may be configured as or otherwise support a means for selecting the first cell based on determining that the first time difference is less than the second time difference. In some examples, the cell selection component 730 may be configured as or otherwise support a means for selecting the second cell based on determining that the second time difference is less than the first time difference.

In some examples, the first time indication or the second time indication or both are included in at least one of a system information block, a radio resource control signal, a MAC control element, or a combination thereof.

In some examples, the indication reception component 760 may be configured as or otherwise support a means for receiving a first time indication associated with a first synchronization signal block and a second time indication associated with a second synchronization signal block. In some examples, the timing information component 725 may be configured as or otherwise support a means for determining a first time of arrival associated with the first time indication and a second time of arrival associated with the second time indication. In some examples, the delay calculation component 750 may be configured as or otherwise support a means for calculating the propagation delay based on a first time difference between the first time indication and the first time of arrival and a second time difference between the second time indication and the second time of arrival.

In some examples, the beam selection component 770 may be configured as or otherwise support a means for selecting a beam based on the calculated propagation delay. In some examples, the first time indication and the second time indication each include a time variance relative to a common time source.

In some examples, the first synchronization signal block and the second synchronization signal block are associated with a same cell. In some examples, the first synchronization signal block and the second synchronization signal block are associated with different cells. In some examples, the uplink channel component 765 may be configured as or otherwise support a means for transmitting a random access preamble to the selected or reselected cell. In some examples, the uplink channel component 765 may be configured as or otherwise support a means for transmitting an uplink shared channel after transmitting the random access preamble.

In some examples, the type of delay measurement includes an absolute time-based delay measurement or a relative time-based delay measurement or both. In some examples, the first cell is associated with a first non-terrestrial device and the second cell is associated with a second non-terrestrial device. In some examples, the first cell and the second cell are associated with a common non-terrestrial device.

Figure 8:
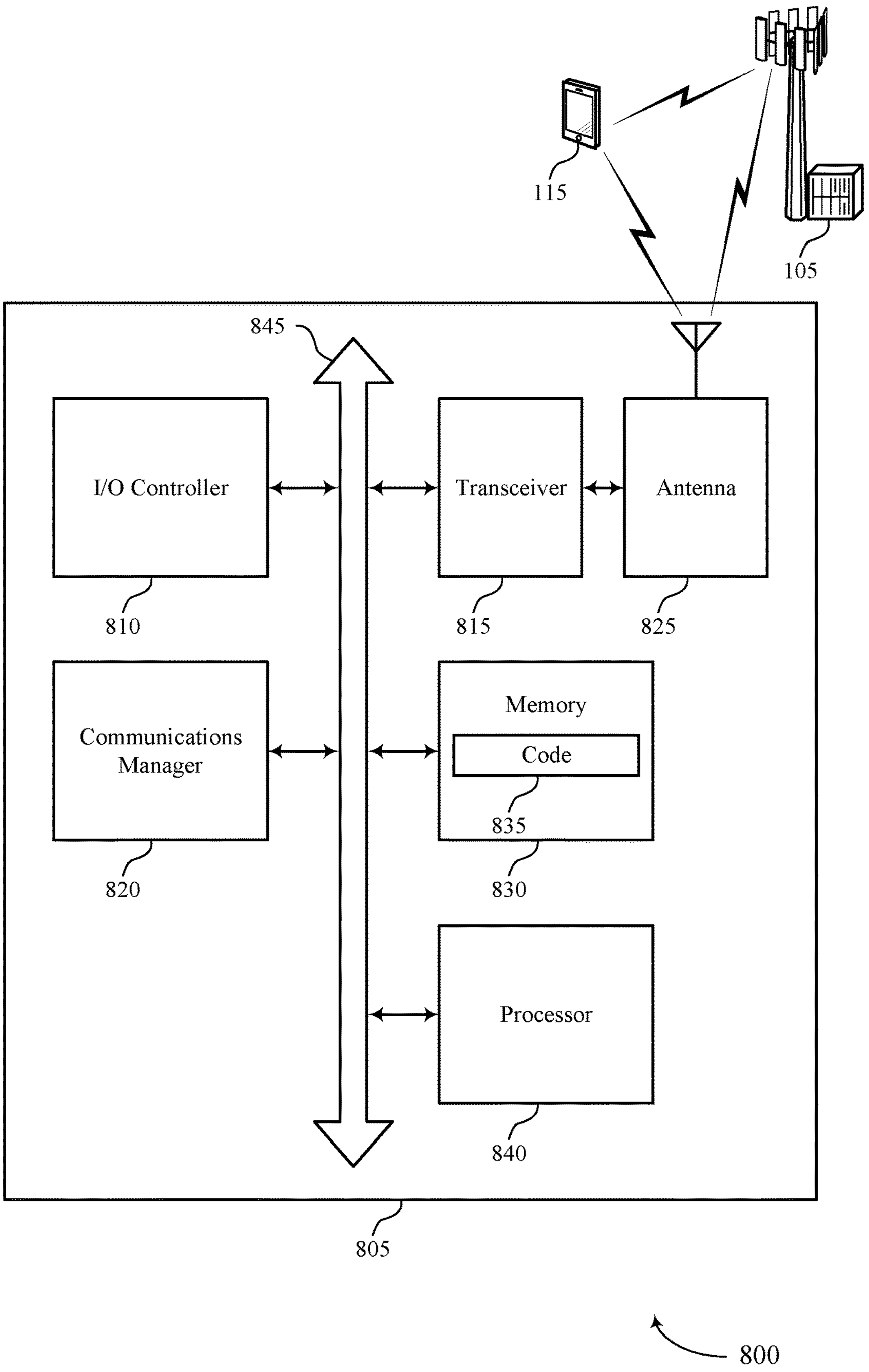
FIG. 8 shows a diagram of a system including a device that supports delay-based cell selection or cell reselection for communication networks in accordance with one or more aspects of the present disclosure.

FIG. 8 shows a diagram of a system 800 including a device 805 that supports delay-based cell selection or cell reselection for communication networks in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting delay-based cell selection or cell reselection for communication networks). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first timing information associated with a first cell and a second timing information associated with a second cell. The communications manager 820 may be configured as or otherwise support a means for selecting or reselecting a cell based on a propagation delay calculated in accordance with a type of delay measurement, the propagation delay being based on the first timing information and the second timing information.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of delay-based cell selection for or cell reselection communication networks as described herein, or the processor 840 and the memory 830 may be otherwise configured to perform or support such operations.

Figure 9:
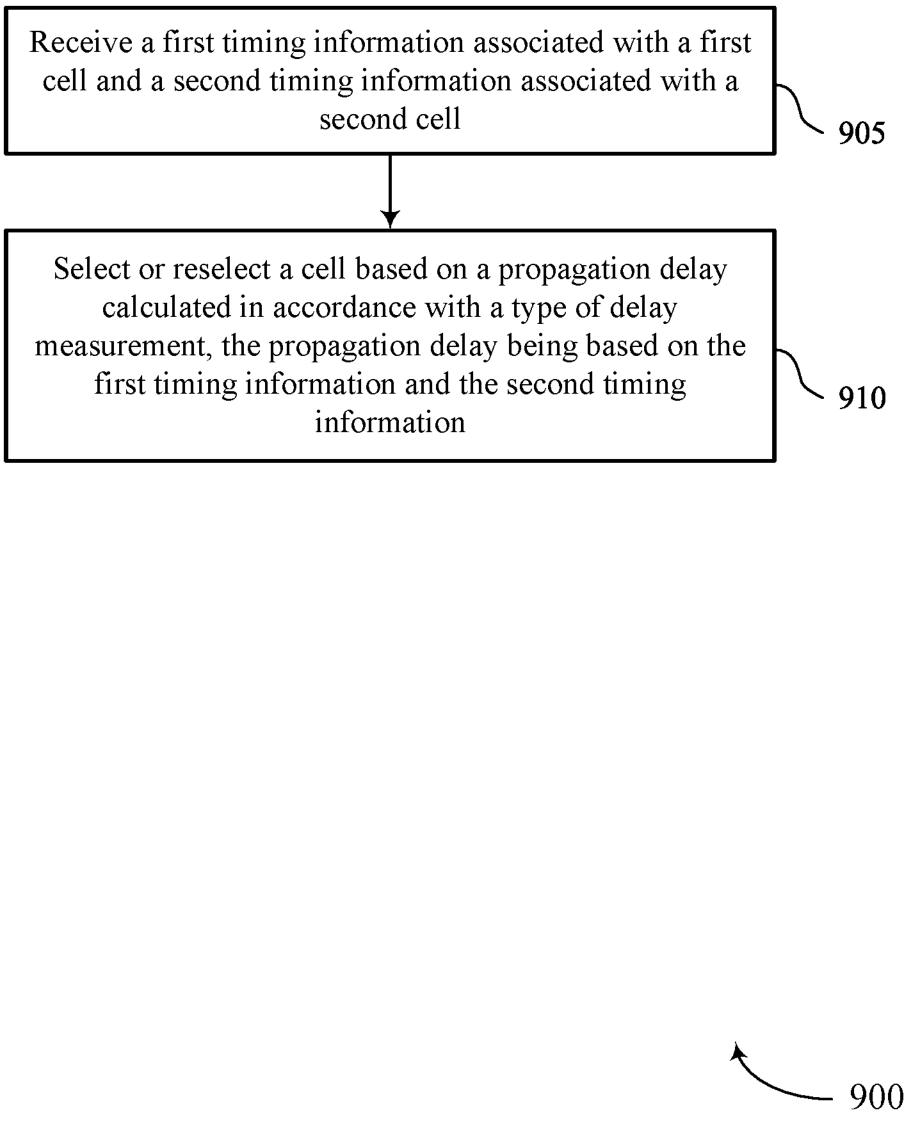
FIGS. 9 through 14 show flowcharts illustrating methods that support delay-based cell selection or cell reselection for communication networks in accordance with one or more aspects of the present disclosure.

FIG. 9 shows a flowchart illustrating a method 900 that supports delay-based cell selection or cell reselection for communication networks in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a first timing information associated with a first cell and a second timing information associated with a second cell. The operations of 905 may be performed in accordance with examples as disclosed herein. In some examples, aspects of the operations of 905 may be performed by a timing information component 725 as described with reference to FIG. 7.

At 910, the method may include selecting or reselecting a cell based on a propagation delay calculated in accordance with a type of delay measurement, the propagation delay being based on the first timing information and the second timing information. The operations of 910 may be performed in accordance with examples as disclosed herein. In some examples, aspects of the operations of 910 may be performed by a cell selection component 730 as described with reference to FIG. 7.

Figure 10:
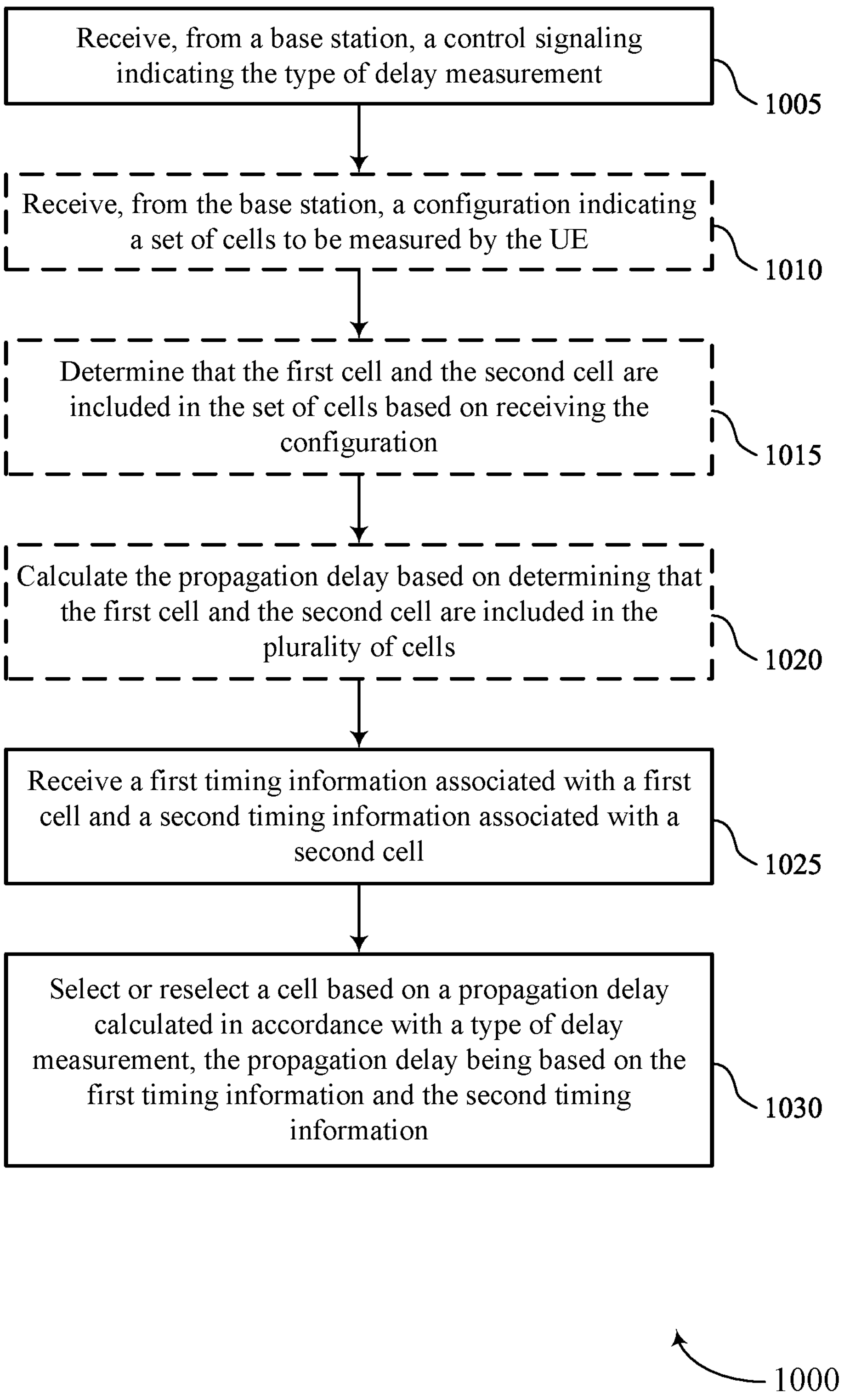

FIG. 10 shows a flowchart illustrating a method 1000 that supports delay-based cell selection or cell reselection for communication networks in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a control signaling indicating the type of delay measurement. The operations of 1005 may be performed in accordance with examples as disclosed herein. In some examples, aspects of the operations of 1005 may be performed by a control signal component 735 as described with reference to FIG. 7.

At 1010, the method may optionally include receiving, from the base station, a configuration indicating a set of multiple cells to be measured by the UE. The operations of 1010 may be performed in accordance with examples as disclosed herein. In some examples, aspects of the operations of 1010 may be performed by a configuration component 740 as described with reference to FIG. 7.

At 1015, the method may optionally include determining that the first cell and the second cell are included in the set of multiple cells based on receiving the configuration. The operations of 1015 may be performed in accordance with examples as disclosed herein. In some examples, aspects of the operations of 1015 may be performed by a cell selection component 730 as described with reference to FIG. 7.

At 1020, the method may optionally include calculating the propagation delay based on determining that the first cell and the second cell are included in the set of multiple cells. The operations of 1020 may be performed in accordance with examples as disclosed herein. In some examples, aspects of the operations of 1020 may be performed by a delay calculation component 750 as described with reference to FIG. 7.

At 1025, the method may include receiving a first timing information associated with a first cell and a second timing information associated with a second cell. The operations of 1025 may be performed in accordance with examples as disclosed herein. In some examples, aspects of the operations of 1025 may be performed by a timing information component 725 as described with reference to FIG. 7.

At 1030, the method may include selecting or reselecting a cell based on a propagation delay calculated in accordance with a type of delay measurement, the propagation delay being based on the first timing information and the second timing information. The operations of 1030 may be performed in accordance with examples as disclosed herein. In some examples, aspects of the operations of 1030 may be performed by a cell selection component 730 as described with reference to FIG. 7.

Figure 11:
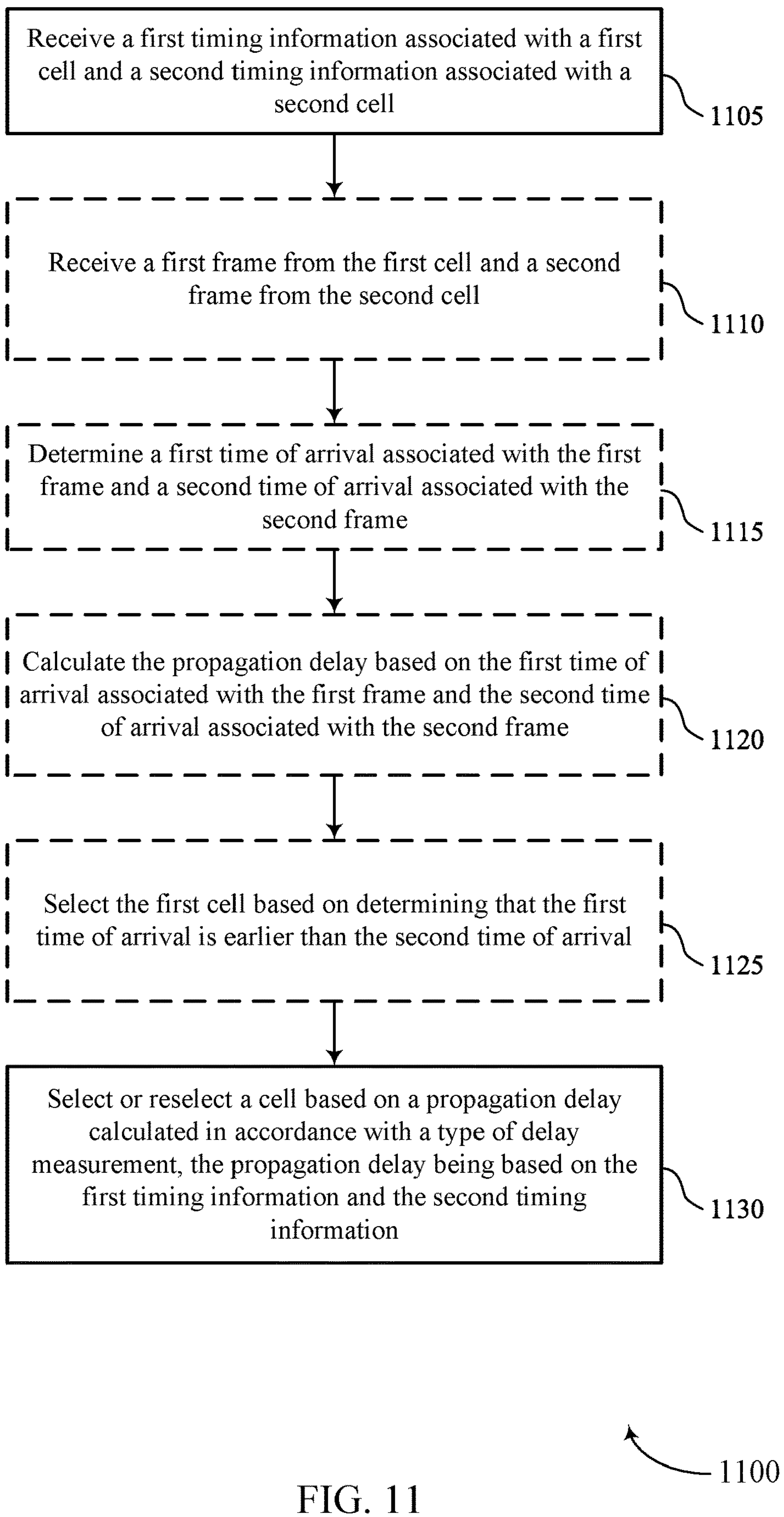

FIG. 11 shows a flowchart illustrating a method 1100 that supports delay-based cell selection or cell reselection for communication networks in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving a first timing information associated with a first cell and a second timing information associated with a second cell. The operations of 1105 may be performed in accordance with examples as disclosed herein. In some examples, aspects of the operations of 1105 may be performed by a timing information component 725 as described with reference to FIG. 7.

At 1110, the method may optionally include receiving a first frame from the first cell and a second frame from the second cell. In some examples, the first frame and the second frame are associated with a common time instant. The operations of 1110 may be performed in accordance with examples as disclosed herein. In some examples, aspects of the operations of 1110 may be performed by a frame reception component 745 as described with reference to FIG. 7.

At 1115, the method may optionally include determining a first time of arrival associated with the first frame and a second time of arrival associated with the second frame. The operations of 1115 may be performed in accordance with examples as disclosed herein. In some examples, aspects of the operations of 1115 may be performed by a timing information component 725 as described with reference to FIG. 7.

At 1120, the method may optionally include calculating the propagation delay based on the first time of arrival associated with the first frame and the second time of arrival associated with the second frame. The operations of 1120 may be performed in accordance with examples as disclosed herein. In some examples, aspects of the operations of 1120 may be performed by a delay calculation component 750 as described with reference to FIG. 7.

At 1125, the method may optionally include selecting the first cell based on determining that the first time of arrival is earlier than the second time of arrival. The operations of 1125 may be performed in accordance with examples as disclosed herein. In some examples, aspects of the operations of 1125 may be performed by a cell selection component 730 as described with reference to FIG. 7.

At 1130, the method may include selecting or reselecting a cell based on a propagation delay calculated in accordance with a type of delay measurement, the propagation delay being based on the first timing information and the second timing information. The operations of 1130 may be performed in accordance with examples as disclosed herein. In some examples, aspects of the operations of 1130 may be performed by a cell selection component 730 as described with reference to FIG. 7.

Figure 12:
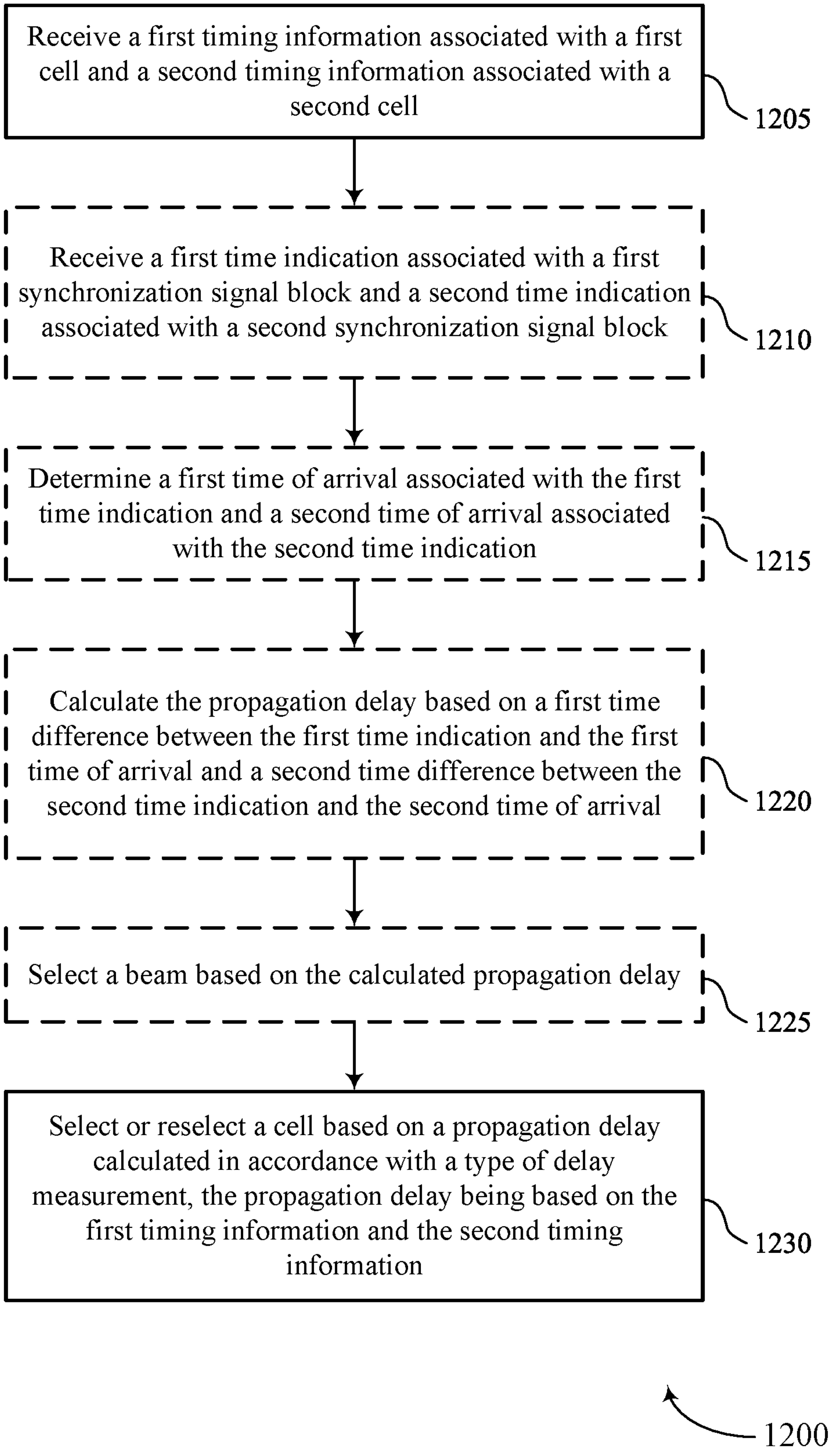

FIG. 12 shows a flowchart illustrating a method 1200 that supports delay-based cell selection or cell reselection for communication networks in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving a first timing information associated with a first cell and a second timing information associated with a second cell. The operations of 1205 may be performed in accordance with examples as disclosed herein. In some examples, aspects of the operations of 1205 may be performed by a timing information component 725 as described with reference to FIG. 7.

At 1210, the method may optionally include receiving a first time indication associated with a first synchronization signal block and a second time indication associated with a second synchronization signal block. The operations of 1210 may be performed in accordance with examples as disclosed herein. In some examples, aspects of the operations of 1210 may be performed by an indication reception component 760 as described with reference to FIG. 7.

At 1215, the method may optionally include determining a first time of arrival associated with the first time indication and a second time of arrival associated with the second time indication. The operations of 1215 may be performed in accordance with examples as disclosed herein. In some examples, aspects of the operations of 1215 may be performed by a timing information component 725 as described with reference to FIG. 7.

At 1220, the method may optionally include calculating the propagation delay based on a first time difference between the first time indication and the first time of arrival and a second time difference between the second time indication and the second time of arrival. The operations of 1220 may be performed in accordance with examples as disclosed herein. In some examples, aspects of the operations of 1220 may be performed by a delay calculation component 750 as described with reference to FIG. 7.

At 1225, the method may optionally include selecting a beam based on the calculated propagation delay. The operations of 1225 may be performed in accordance with examples as disclosed herein. In some examples, aspects of the operations of 1225 may be performed by a beam selection component 770 as described with reference to FIG. 7.

At 1230, the method may include selecting or reselecting a cell based on a propagation delay calculated in accordance with a type of delay measurement, the propagation delay being based on the first timing information and the second timing information. The operations of 1230 may be performed in accordance with examples as disclosed herein. In some examples, aspects of the operations of 1230 may be performed by a cell selection component 730 as described with reference to FIG. 7.

Figure 13:
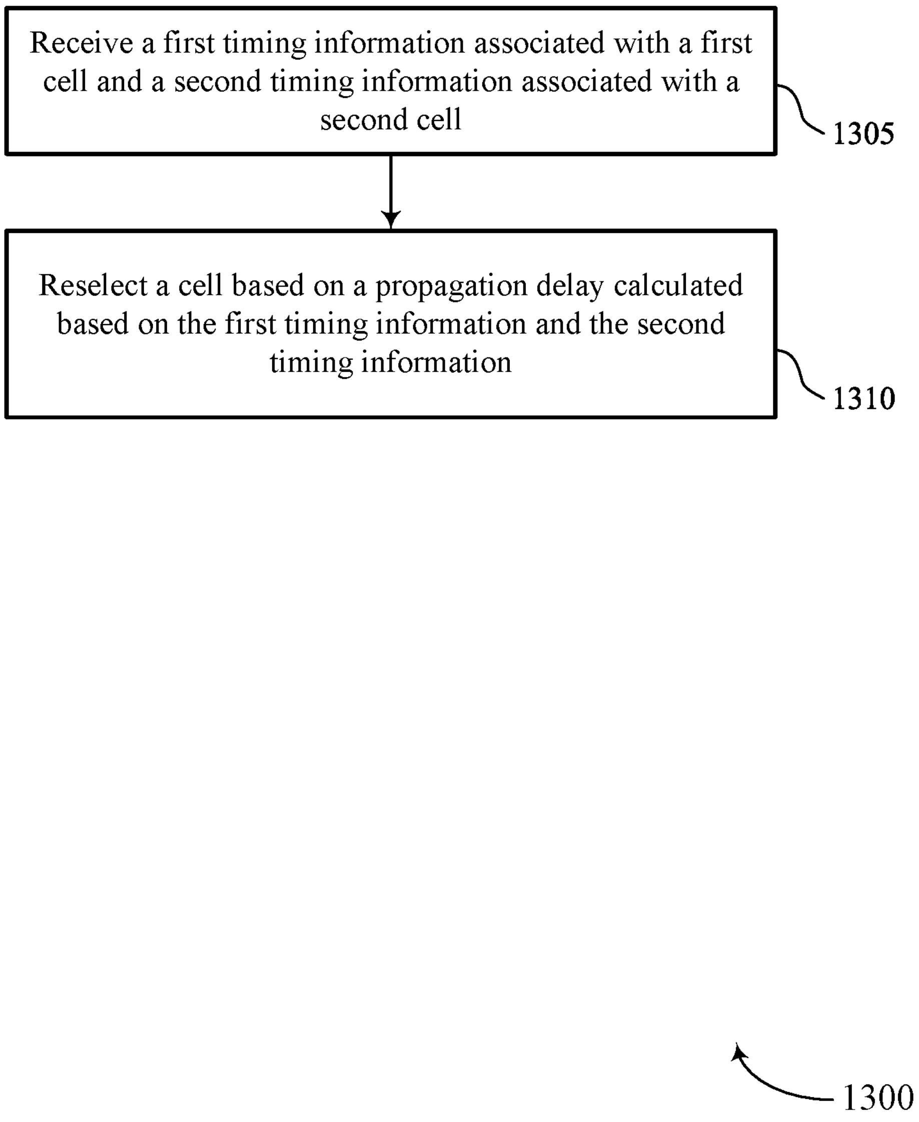

FIG. 13 shows a flowchart illustrating a method 1300 that supports delay-based cell selection or cell reselection for communication networks in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a first timing information associated with a first cell and a second timing information associated with a second cell. The operations of 1305 may be performed in accordance with examples as disclosed herein. In some examples, aspects of the operations of 1305 may be performed by a timing information component 725 as described with reference to FIG. 7.

At 1310, the method may include reselecting a cell based on a propagation delay calculated based on the first timing information and the second timing information. The operations of 1310 may be performed in accordance with examples as disclosed herein. In some examples, aspects of the operations of 1310 may be performed by a cell selection component 730 as described with reference to FIG. 7.

Figure 14:
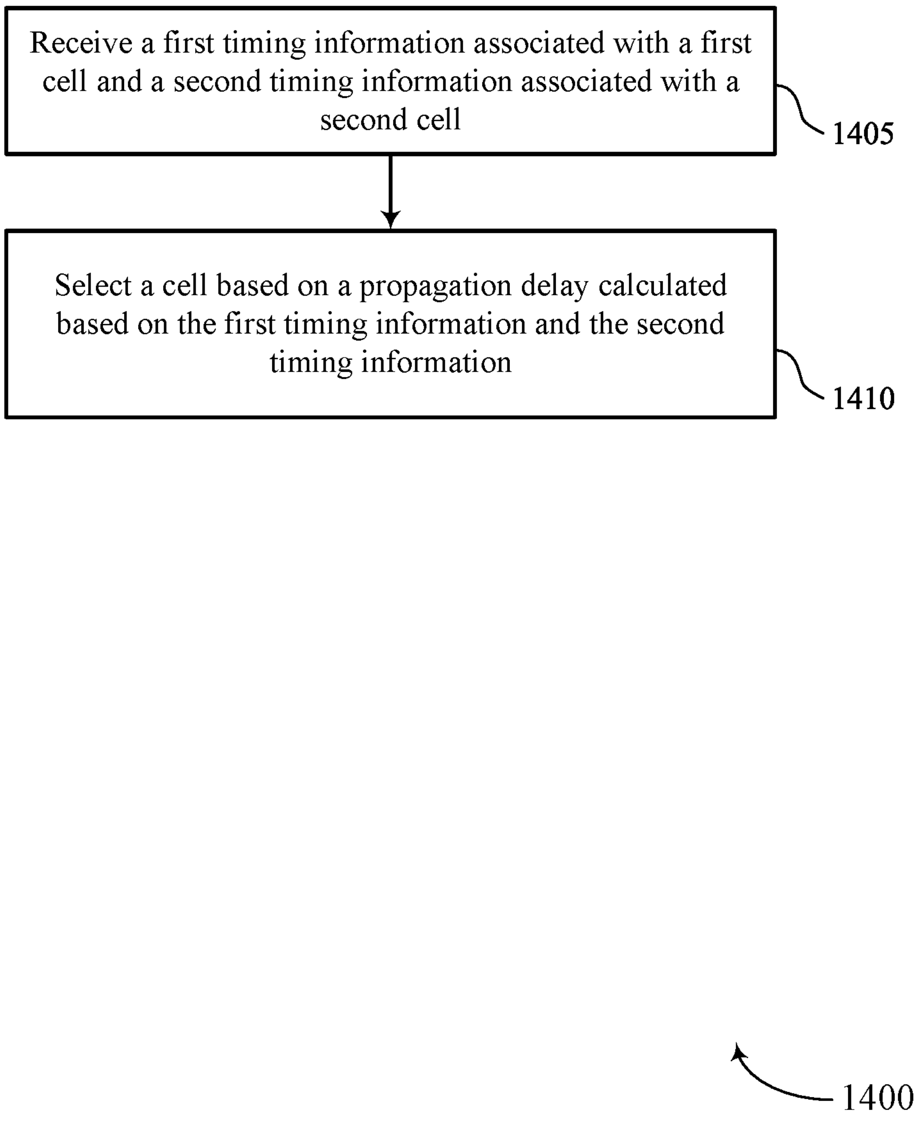

FIG. 14 shows a flowchart illustrating a method 1400 that supports delay-based cell selection or cell reselection for communication networks in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a first timing information associated with a first cell and a second timing information associated with a second cell. The operations of 1405 may be performed in accordance with examples as disclosed herein. In some examples, aspects of the operations of 1405 may be performed by a timing information component 725 as described with reference to FIG. 7.

At 1410, the method may include selecting a cell based on a propagation delay calculated based on the first timing information and the second timing information. The operations of 1410 may be performed in accordance with examples as disclosed herein. In some examples, aspects of the operations of 1410 may be performed by a cell selection component 730 as described with reference to FIG. 7.

The following provides an overview of aspects of the present disclosure:

Aspect 1: A method for wireless communication at a UE, comprising: receiving a first timing information associated with a first cell and a second timing information associated with a second cell; and reselecting a cell based at least in part on a propagation delay calculated based at least in part on the first timing information and the second timing information.

Aspect 2: The method of aspect 1, further comprising: calculating the propagation delay based at least in part on satellite ephemeris information and a location of the UE.

Aspect 3: The method of any of aspects 1 through 2, further comprising: calculating the propagation delay based at least in part on a type of delay measurement.

Aspect 4: The method of aspect 3, further comprising: receiving, from a base station, a control signaling indicating the type of delay measurement.

Aspect 5: The method of any of aspects 1 through 4, further comprising: receiving, from a base station, a configuration indicating a plurality of cells to be measured by the UE.

Aspect 6: The method of aspect 5, further comprising: determining that the first cell and the second cell are included in the plurality of cells based at least in part on the configuration; and calculating the propagation delay based at least in part on the first cell and the second cell being included in the plurality of cells.

Aspect 7: The method of any of aspects 1 through 6, further comprising: receiving a first frame from the first cell and a second frame from the second cell, wherein the first frame and the second frame are associated with a common time instant; determining a first time of arrival associated with the first frame and a second time of arrival associated with the second frame; and calculating the propagation delay based at least in part on the first time of arrival associated with the first frame and the second time of arrival associated with the second frame.

Aspect 8: The method of aspect 7, further comprising: selecting the first cell based at least in part on the first time of arrival being earlier than the second time of arrival; or selecting the second cell based at least in part on the second time of arrival being earlier than the first time of arrival.

Aspect 9: The method of any of aspects 7 through 8, wherein the first frame and the second frame are associated with a common system frame number.

Aspect 10: The method of any of aspects 1 through 9, further comprising: receiving a first message from the first cell and a second message from the second cell, wherein the first message is associated with a first timestamp and the second message is associated with a second timestamp; determining a first time of arrival associated with the first message and a second time of arrival associated with the second message; and calculating the propagation delay based at least in part on a first time difference between the first timestamp and the first time of arrival and a second time difference between the second timestamp and the second time of arrival.

Aspect 11: The method of aspect 10, further comprising: selecting the first cell based at least in part on the first time difference being less than the second time difference; or selecting the second cell based at least in part on the second time difference being less than the first time difference.

Aspect 12: The method of any of aspects 1 through 11, further comprising: receiving a first time indication from the first cell and a second time indication from the second cell, wherein the first time indication and the second time indication are associated with a common time source; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 13: The method of aspect 12, further comprising: selecting the first cell based at least in part on the first time difference being less than the second time difference; or selecting the second cell based at least in part on the second time difference being less than the first time difference.

Aspect 14: The method of any of aspects 12 through 13, wherein the first time indication or the second time indication or both are included in at least one of a system information block, a radio resource control signal, a MAC control element, or a combination thereof.

Aspect 15: The method of any of aspects 1 through 14, further comprising: receiving a first time indication associated with a first synchronization signal block and a second time indication associated with a second synchronization signal block; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 16: The method of aspect 15, further comprising: selecting a beam based at least in part on the calculated propagation delay.

Aspect 17: The method of any of aspects 15 through 16, wherein the first time indication and the second time indication each comprise a time variance relative to a common time source.

Aspect 18: The method of any of aspects 15 through 17, wherein the first synchronization signal block and the second synchronization signal block are associated with a same cell.

Aspect 19: The method of any of aspects 15 through 19, wherein the first synchronization signal block and the second synchronization signal block are associated with different cells.

Aspect 20: The method of any of aspects 1 through 21, further comprising: reselecting the cell.

Aspect 21: The method of any of aspects 1 through 22, further comprising: transmitting a random access preamble to the reselected cell.

Aspect 22: The method of aspect 23, further comprising: transmitting an uplink shared channel after the random access preamble.

Aspect 23: The method of any of aspects 1 through 22, further comprising: calculating the propagation delay based at least in part on an absolute time-based delay measurement or a relative time-based delay measurement or both.

Aspect 24: The method of any of aspects 1 through 23, wherein the first cell is associated with a first non-terrestrial device and the second cell is associated with a second non-terrestrial device.

Aspect 25: The method of any of aspects 1 through 24, wherein the first cell and the second cell are associated with a common non-terrestrial device.

Aspect 26: A method for wireless communication at a UE, comprising: receiving a first timing information associated with a first cell and a second timing information associated with a second cell; and selecting a cell based at least in part on a propagation delay calculated based at least in part on the first timing information and the second timing information.

Aspect 27: The method of aspect 26, further comprising: calculating the propagation delay based at least in part on satellite ephemeris information and a location of the UE.

Aspect 28: The method of any of aspects 26 through 27, further comprising: calculating the propagation delay based at least in part on a type of delay measurement.

Aspect 29: The method of aspect 28, further comprising: receiving, from a base station, a control signaling indicating the type of delay measurement.

Aspect 30: The method of any of aspects 26 through 29, further comprising: receiving, from a base station, a configuration indicating a plurality of cells to be measured by the UE.

Aspect 31: The method of aspect 30, further comprising: determining that the first cell and the second cell are included in the plurality of cells based at least in part on the configuration; and calculating the propagation delay based at least in part on the first cell and the second cell being included in the plurality of cells.

Aspect 32: The method of any of aspects 26 through 31, further comprising: receiving a first frame from the first cell and a second frame from the second cell, wherein the first frame and the second frame are associated with a common time instant; determining a first time of arrival associated with the first frame and a second time of arrival associated with the second frame; and calculating the propagation delay based at least in part on the first time of arrival associated with the first frame and the second time of arrival associated with the second frame.

Aspect 33: The method of aspect 32, further comprising: selecting the first cell based at least in part on the first time of arrival being earlier than the second time of arrival; or selecting the second cell based at least in part on the second time of arrival being earlier than the first time of arrival.

Aspect 34: The method of any of aspects 32 through 33, wherein the first frame and the second frame are associated with a common system frame number.

Aspect 35: The method of any of aspects 26 through 34, further comprising: receiving a first message from the first cell and a second message from the second cell, wherein the first message is associated with a first timestamp and the second message is associated with a second timestamp; determining a first time of arrival associated with the first message and a second time of arrival associated with the second message; and calculating the propagation delay based at least in part on a first time difference between the first timestamp and the first time of arrival and a second time difference between the second timestamp and the second time of arrival.

Aspect 36: The method of aspect 35, further comprising: selecting the first cell based at least in part on the first time difference being less than the second time difference; or selecting the second cell based at least in part on the second time difference being less than the first time difference.

Aspect 37: The method of any of aspects 26 through 36, further comprising: receiving a first time indication from the first cell and a second time indication from the second cell, wherein the first time indication and the second time indication are associated with a common time source; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 38: The method of aspect 37, further comprising: selecting the first cell based at least in part on the first time difference being less than the second time difference; or selecting the second cell based at least in part on the second time difference being less than the first time difference.

Aspect 39: The method of any of aspects 37 through 38, wherein the first time indication or the second time indication or both are included in at least one of a system information block, a radio resource control signal, a MAC control element, or a combination thereof.

Aspect 40: The method of any of aspects 26 through 39, further comprising: receiving a first time indication associated with a first synchronization signal block and a second time indication associated with a second synchronization signal block; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 41: The method of aspect 40, further comprising: selecting a beam based at least in part on the calculated propagation delay.

Aspect 42: The method of any of aspects 40 through 41, wherein the first time indication and the second time indication each comprise a time variance relative to a common time source.

Aspect 43: The method of any of aspects 40 through 42, wherein the first synchronization signal block and the second synchronization signal block are associated with a same cell.

Aspect 44: The method of any of aspects 40 through 43, wherein the first synchronization signal block and the second synchronization signal block are associated with different cells.

Aspect 45: The method of any of aspects 26 through 44, further comprising: transmitting a random access preamble to the selected cell.

Aspect 46: The method of aspect 45, further comprising: transmitting an uplink shared channel after the random access preamble.

Aspect 47: The method of any of aspects 26 through 46, further comprising: calculating the propagation delay based at least in part on an absolute time-based delay measurement or a relative time-based delay measurement or both.

Aspect 48: The method of any of aspects 26 through 47, wherein the first cell is associated with a first non-terrestrial device and the second cell is associated with a second non-terrestrial device.

Aspect 49: The method of any of aspects 26 through 48, wherein the first cell and the second cell are associated with a common non-terrestrial device.

Aspect 50: An apparatus for wireless communication at a UE, comprising a processor; memory coupled with the processor; the processor configured to perform a method of any of aspects 1 through 25

Aspect 51: An apparatus for wireless communication at a UE, comprising at least one means for performing a method of any of aspects 1 through 25.

Aspect 52: A non-transitory computer-readable medium storing code for wireless communication at a UE, the code comprising instructions executable by a processor to perform a method of any of aspects 1 through 25.

Aspect 53: An apparatus for wireless communication at a UE, comprising a processor; memory coupled with the processor; the processor configured to perform a method of any of aspects 26 through 49.

Aspect 54: An apparatus for wireless communication at a UE, comprising at least one means for performing a method of any of aspects 26 through 49.

Aspect 55: A non-transitory computer-readable medium storing code for wireless communication at a UE, the code comprising instructions executable by a processor to perform a method of any of aspects 26 through 49.

Aspect 56: A method for wireless communication at a UE, comprising: receiving a first timing information associated with a first cell and a second timing information associated with a second cell; and selecting or reselecting a cell based at least in part on a propagation delay calculated in accordance with a type of delay measurement, the propagation delay being based at least in part on the first timing information and the second timing information.

Aspect 57: The method of aspect 56, further comprising: receiving, from a base station, a control signaling indicating the type of delay measurement.

Aspect 58: The method of any of aspects 56 through 57, further comprising: receiving, from the base station, a configuration indicating a plurality of cells to be measured by the UE.

Aspect 59: The method of aspect 58, further comprising: determining that the first cell and the second cell are included in the plurality of cells based at least in part on receiving the configuration; and calculating the propagation delay based at least in part on determining that the first cell and the second cell are included in the plurality of cells.

Aspect 60: The method of any of aspects 56 through 59, further comprising: receiving a first frame from the first cell and a second frame from the second cell, wherein the first frame and the second frame are associated with a common time instant; determining a first time of arrival associated with the first frame and a second time of arrival associated with the second frame; and calculating the propagation delay based at least in part on the first time of arrival associated with the first frame and the second time of arrival associated with the second frame.

Aspect 61: The method of aspect 60, further comprising: selecting the first cell based at least in part on determining that the first time of arrival is earlier than the second time of arrival; or selecting the second cell based at least in part on determining that the second time of arrival is earlier than the first time of arrival.

Aspect 62: The method of any of aspects 60 through 61, wherein the first frame and the second frame are associated with a common system frame number.

Aspect 63: The method of any of aspects 56 through 59, further comprising: receiving a first message from the first cell and a second message from the second cell, wherein the first message is associated with a first timestamp and the second message is associated with a second timestamp; determining a first time of arrival associated with the first message and a second time of arrival associated with the second message; and calculating the propagation delay based at least in part on a first time difference between the first timestamp and the first time of arrival and a second time difference between the second timestamp and the second time of arrival.

Aspect 64: The method of aspect 63, further comprising: selecting the first cell based at least in part on determining that the first time difference is less than the second time difference; or selecting the second cell based at least in part on determining that the second time difference is less than the first time difference.

Aspect 65: The method of any of aspects 56 through 59, further comprising: receiving a first time indication from the first cell and a second time indication from the second cell, wherein the first time indication and the second time indication are associated with a common time source; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 66: The method of aspect 65, further comprising: selecting the first cell based at least in part on determining that the first time difference is less than the second time difference; or selecting the second cell based at least in part on determining that the second time difference is less than the first time difference.

Aspect 67: The method of any of aspects 65 through 66, wherein the first time indication or the second time indication or both are included in at least one of a system information block, a radio resource control signal, a MAC control element, or a combination thereof.

Aspect 68: The method of any of aspects 56 through 59, further comprising: receiving a first time indication associated with a first synchronization signal block and a second time indication associated with a second synchronization signal block; determining a first time of arrival associated with the first time indication and a second time of arrival associated with the second time indication; and calculating the propagation delay based at least in part on a first time difference between the first time indication and the first time of arrival and a second time difference between the second time indication and the second time of arrival.

Aspect 69: The method of aspect 68, further comprising: selecting a beam based at least in part on the calculated propagation delay.

Aspect 70: The method of aspect 69, wherein the first time indication and the second time indication each comprise a time variance relative to a common time source.

Aspect 71: The method of aspect 69, wherein the first synchronization signal block and the second synchronization signal block are associated with a same cell.

Aspect 72: The method of aspect 69, wherein the first synchronization signal block and the second synchronization signal block are associated with different cells.

Aspect 73: The method of any of aspects 56 through 72, further comprising: transmitting a random access preamble to the selected or reselected cell.

Aspect 74: The method of any of aspects 56 through 75, further comprising: transmitting an uplink shared channel after transmitting the random access preamble.

Aspect 76: The method of any of aspects 56 through 74, wherein the type of delay measurement comprises an absolute time-based delay measurement or a relative time-based delay measurement or both.

Aspect 77: The method of any of aspects 56 through 76, wherein the first cell is associated with a first non-terrestrial device and the second cell is associated with a second non-terrestrial device.

Aspect 78: The method of any of aspects 56 through 77, wherein the first cell and the second cell are associated with a common non-terrestrial device.

Aspect 79: An apparatus for wireless communication at a UE, comprising a processor; memory coupled with the processor; the processor configured to perform a method of any of aspects 56 through 78.

Aspect 80: An apparatus for wireless communication at a UE, comprising at least one means for performing a method of any of aspects 56 through 78.

Aspect 81: A non-transitory computer-readable medium storing code for wireless communication at a UE, the code comprising instructions executable by a processor to perform a method of any of aspects 56 through 78.

It should be noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

receive, from a network entity, a control signaling indicating a type of delay measurement for the UE to use in reselection of a cell;

receive a first frame from a first cell and a second frame from a second cell, wherein:

the first cell and the second cell are each candidate cells for the reselection; and the first frame and the second frame are associated with a common time instant;

determine a first time of arrival associated with the first frame and a second time of arrival associated with the second frame;

perform an absolute time-based delay measurement or a relative time-based delay measurement in accordance with the type of delay measurement indicated by the control signaling and based at least in part on the first time of arrival and the second time of arrival; and reselect the first cell or the second cell based at least in part on a propagation delay calculated based at least in part on the first time of arrival associated with the first frame and the second time of arrival associated with the second frame in accordance with the absolute time-based delay measurement or the relative time-based delay measurement.

2. The UE of claim 1, wherein the one or more processors are individually or collectively operable to execute the code to cause the UE to:

calculate the propagation delay based at least in part on a location of the UE and first timing information comprising satellite ephemeris information.

3. The UE of claim 1, wherein the one or more processors are individually or collectively operable to execute the code to cause the UE to:

receive, from the network entity, a configuration indicating a plurality of cells to be measured by the UE.

4. The UE of claim 3, wherein the one or more processors are individually or collectively operable to execute the code to cause the UE to:

determine that the first cell and the second cell are included in the plurality of cells based at least in part on the configuration; and calculate the propagation delay based at least in part on the first cell and the second cell being included in the plurality of cells.

5. The UE of claim 1, wherein the one or more processors are individually or collectively operable to execute the code to cause the UE to:

select the first cell based at least in part on the first time of arrival being earlier than the second time of arrival; or select the second cell based at least in part on the second time of arrival being earlier than the first time of arrival.

6. The UE of claim 1, wherein the first frame and the second frame are associated with a common system frame number.

7. The UE of claim 1, wherein the one or more processors are individually or collectively operable to execute the code to cause the UE to:

receive a first message from the first cell and a second message from the second cell, wherein the first message is associated with a first timestamp and the second message is associated with a second timestamp;

determine the first time of arrival associated with the first message and the second time of arrival associated with the second message; and calculate the propagation delay based at least in part on a first time difference between the first timestamp and the first time of arrival and a second time difference between the second timestamp and the second time of arrival.

8. The UE of claim 7, wherein the one or more processors are individually or collectively operable to execute the code to cause the UE to:

select the first cell based at least in part on the first time difference being less than the second time difference; or select the second cell based at least in part on the second time difference being less than the first time difference.

9. The UE of claim 1, wherein the one or more processors are individually or collectively operable to execute the code to cause the UE to:

receive a first time indication from the first cell and a second time indication from the second cell, wherein the first time indication and the second time indication are associated with a common time source;

determine the first time of arrival associated with the first time indication and the second time of arrival associated with the second time indication; and calculate the propagation delay based at least in part on a first time difference between the first time indication and the first time of arrival and a second time difference between the second time indication and the second time of arrival.

10. The UE of claim 9, wherein the one or more processors are individually or collectively operable to execute the code to cause the UE to:

select the first cell based at least in part on the first time difference being less than the second time difference; or select the second cell based at least in part on the second time difference being less than the first time difference.

11. The UE of claim 9, wherein the first time indication or the second time indication or both are included in at least one of a system information block, a radio resource control signal, a MAC control element, or a combination thereof.

12. The UE of claim 1, wherein the one or more processors are individually or collectively operable to execute the code to cause the UE to:

receive a first time indication associated with a first synchronization signal block and a second time indication associated with a second synchronization signal block;

determine the first time of arrival associated with the first time indication and the second time of arrival associated with the second time indication; and calculate the propagation delay based at least in part on a first time difference between the first time indication and the first time of arrival and a second time difference between the second time indication and the second time of arrival.

13. The UE of claim 12, wherein the one or more processors are individually or collectively operable to execute the code to cause the UE to:

select a beam based at least in part on the calculated propagation delay.

14. The UE of claim 12, wherein the first time indication and the second time indication each comprise a time variance relative to a common time source.

15. The UE of claim 12, wherein the first synchronization signal block and the second synchronization signal block are associated with a same cell.

16. The UE of claim 12, wherein the first synchronization signal block and the second synchronization signal block are associated with different cells.

17. The UE of claim 1, comprising an antenna array, wherein the one or more processors and the antenna array are individually or collectively further operable to cause the UE to:

transmit a random access preamble to the reselected cell.

18. The UE of claim 17, wherein the one or more processors are individually or collectively operable to execute the code to cause the UE to:

transmit an uplink shared channel after the random access preamble.

19. The UE of claim 1, wherein the one or more processors are individually or collectively operable to execute the code to cause the UE to:

calculate the propagation delay based at least in part on the absolute time-based delay measurement or the relative time-based delay measurement or both.

20. The UE of claim 1, wherein the first cell is associated with a first non-terrestrial device and the second cell is associated with a second non-terrestrial device.

21. The UE of claim 1, wherein the first cell and the second cell are associated with a common non-terrestrial device.

22. A user equipment (UE) for wireless communication, comprising:

one or more memories storing processor-executable code; and one or more processors coupled with the one or more memories and individually or collectively operable to execute the code to cause the UE to:

receive, from a network entity, a control signaling indicating a type of delay measurement for the UE to use in selection of a cell;

receive a first frame from a first cell and a second frame from a second cell, wherein:

the first cell and the second cell are each candidate cells for the selection; and the first frame and the second frame are associated with a common time instant;

determine a first time of arrival associated with the first frame and a second time of arrival associated with the second frame;

perform an absolute time-based delay measurement or a relative time- based delay measurement in accordance with the type of delay measurement indicated by the control signaling and based at least in part on the first time of arrival and the second time of arrival; and select the first cell or the second cell based at least in part on a propagation delay calculated based at least in part on the first time of arrival associated with the first frame and the second time of arrival associated with the second frame in accordance with the absolute time-based delay measurement or the relative time-based delay measurement.

23. The UE of claim 22, wherein the one or more processors are individually or collectively operable to execute the code to cause the UE to:

calculate the propagation delay based at least in part on a location of the UE and first timing information comprising satellite ephemeris information.

24. A method for wireless communication at a user equipment (UE), comprising:

receiving, from a network entity, a control signaling indicating a type of delay measurement for the UE to use in reselecting a cell;

receiving a first frame from a first cell and a second frame from a second cell, wherein:

the first cell and the second cell are each candidate cells for the reselection; and the first frame and the second frame are associated with a common time instant;

determining a first time of arrival associated with the first frame and a second time of arrival associated with the second frame;

performing an absolute time-based delay measurement or a relative time-based delay measurement in accordance with the type of delay measurement indicated by the control signaling and based at least in part on the first time of arrival and the second time of arrival; and reselecting the first cell or the second cell based at least in part on a propagation delay calculated based at least in part on the first time of arrival associated with the first frame and the second time of arrival associated with the second frame in accordance with the absolute time-based delay measurement or the relative time-based delay measurement.

25. A method for wireless communication at a user equipment (UE), comprising:

receiving, from a network entity, a control signaling indicating a type of delay measurement for the UE to use in selecting a cell;

receiving a first frame from a first cell and a second frame from a second cell, wherein:

the first cell and the second cell are each candidate cells for the selection; and the first frame and the second frame are associated with a common time instant;

determining a first time of arrival associated with the first frame and a second time of arrival associated with the second frame;

performing an absolute time-based delay measurement or a relative time-based delay measurement in accordance with the type of delay measurement indicated by the control signaling and based at least in part on the first time of arrival and the second time of arrival; and selecting the first cell or the second cell based at least in part on a propagation delay calculated based at least in part on the first time of arrival associated with the first frame and the second time of arrival associated with the second frame in accordance with the absolute time-based delay measurement or the relative time-based delay measurement.

* * * * *